(12) United States Patent
Kono et al.

(10) Patent No.: US 11,991,319 B2
(45) Date of Patent: May 21, 2024

(54) APPARATUS, INFORMATION PROCESSING SYSTEM, AND NON-TRANSITORY RECORDING MEDIUM

(71) Applicants: Shuuko Kono, Tokyo (JP); Yoshinori Tatsunokuchi, Kanagawa (JP); Hirobumi Tsuruoka, Tokyo (JP); Masayoshi Furusawa, Kanagawa (JP); Satoru Toya, Tokyo (JP)

(72) Inventors: Shuuko Kono, Tokyo (JP); Yoshinori Tatsunokuchi, Kanagawa (JP); Hirobumi Tsuruoka, Tokyo (JP); Masayoshi Furusawa, Kanagawa (JP); Satoru Toya, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/952,317

(22) Filed: Sep. 26, 2022

(65) Prior Publication Data

US 2023/0122437 A1 Apr. 20, 2023

(30) Foreign Application Priority Data

Oct. 15, 2021 (JP) ................................. 2021-169764

(51) Int. Cl.
*H04N 1/00* (2006.01)
*G06F 3/12* (2006.01)
*H04N 1/32* (2006.01)

(52) U.S. Cl.
CPC ..... *H04N 1/00029* (2013.01); *H04N 1/00344* (2013.01)

(58) Field of Classification Search
None
See application file for complete search history.

(56) References Cited

U.S. PATENT DOCUMENTS

2002/0091971 A1 7/2002 Sawada et al.
2003/0086109 A1 5/2003 Fitch
(Continued)

FOREIGN PATENT DOCUMENTS

CN 108694027 * 10/2018 ............... G06F 3/12
JP 2002-123383 A 4/2002
(Continued)

OTHER PUBLICATIONS

Extended European Search Report dated Mar. 1, 2023 in European Patent Application No. 22194341.8, 8 pages.

*Primary Examiner* — Beniyam Menberu
(74) *Attorney, Agent, or Firm* — XSENSUS LLP

(57) ABSTRACT

An apparatus includes circuitry to receive an input of problem information that is information on a problem, transmit the problem information to an information processing apparatus communicably connected to the apparatus via a network, and receive, from the information processing apparatus, troubleshooting information corresponding to the problem information. The troubleshooting information is information for solving the problem. The circuitry outputs the troubleshooting information, and transmits, to an extraneous resource, a repair request including the problem information and information indicating whether the troubleshooting information has been output.

9 Claims, 46 Drawing Sheets

(56) References Cited

U.S. PATENT DOCUMENTS

| | | | | |
|---|---|---|---|---|
| 2005/0021721 A1* | 1/2005 | Takahashi | .......... | H04N 1/32662 |
| | | | | 709/223 |
| 2005/0286435 A1* | 12/2005 | Ogawa | ................ | H04L 41/0654 |
| | | | | 370/252 |
| 2008/0195694 A1* | 8/2008 | Alaniz | ................ | H04L 41/5064 |
| | | | | 709/203 |
| 2011/0299109 A1* | 12/2011 | Kamisuwa | ......... | G03G 15/5079 |
| | | | | 358/1.14 |
| 2019/0266253 A1* | 8/2019 | Maiti | .................... | G06F 16/243 |
| 2019/0306327 A1* | 10/2019 | Matysiak | ................ | G06F 3/167 |
| 2020/0067853 A1* | 2/2020 | Koga | ................. | G06F 16/9535 |

FOREIGN PATENT DOCUMENTS

| | | | | |
|---|---|---|---|---|
| JP | 2003296082 | * | 10/2003 | ............... G06F 3/12 |
| JP | 2005-107992 | | 4/2005 | |
| JP | 2010176365 | * | 8/2010 | ............. G06F 11/30 |
| JP | 2014238689 | * | 12/2014 | ............. G06F 13/00 |
| JP | 2018-054742 | | 4/2018 | |
| JP | 2019175276 | * | 10/2019 | ............. G06F 16/00 |
| JP | 2019213100 | * | 12/2019 | ............. H04N 1/00 |
| JP | 2019215392 | * | 12/2019 | ............. H04N 1/00 |
| WO | WO 2019156103 | * | 8/2019 | ......... G06F 16/3331 |
| WO | WO 2020246325 | * | 12/2020 | ............. G06N 20/00 |

\* cited by examiner

FIG. 6

| DEVICE NUMBER | 3F69-XXXXXXX |
|---|---|
| MODEL NAME | MFP001 |
| NAME OF PERSON IN CHARGE | TARO PATENT |
| PHONE NUMBER | 0123456789 |
| E-MAIL ADDRESS | ---@jp.xxx.com |
| COMPANY NAME | YY Co. |
| DEPARTMENT NAME | XX DEPARTMENT |
| REGION | JAPAN |

FIG. 7

| CATEGO-RY ID | CATEGO-RY NAME | SUB-CATE-GORY ID | SUBCATEGORY NAME | SYMPTOM CODE | FAQ | URL |
|---|---|---|---|---|---|---|
| 5 | PAPER JAM | 1 | PAPER JAM IN MAIN BODY B | 5-1 | PAPER JAM OCCURS AT XX | https://www.mytube.com/watch?v=1234567890 |
| | | 2 | PAPER JAM IN MAIN BODY A2 | 5-2 | PAPER JAM OCCURS AT YY | ↑ |
| | | 3 | PAPER JAM IN MAIN BODY A1 | 5-3 | PAPER JAM OCCURS AT ZZ | https://www.mytube.com/watch?v=xxxxx |
| | | 4 | PAPER JAM IN MAIN BODY C | 5-4 | PAPER JAM OCCURS AT WW | https://www.mytube.com/watch?v=xxxxx |
| | | 5 | ADF | 5-5 | XXXXXXXXXX | https://www.mytube.com/watch?v=xxxxx |
| | | 6 | FINISHER | 5-6 | XXXXXXXXXX | https://www.mytube.com/watch?v=xxxxx |
| | | 7 | INSERT FEEDER (TO BE CONFIRMED) | 5-7 | XXXXXXXXXX | NA |
| | | 8 | PAPER JAM IN MAIN BODY X | 5-8 | XXXXXXXXXX | NA |
| | | 9 | PAPER JAM IN MAIN BODY Y | 5-9 | XXXXXXXXXX | https://www.mytube.com/watch?v=xxxxx |
| | | 10 | PAPER JAM IN MAIN BODY Z | 5-10 | XXXXXXXXXX | https://www.mytube.com/watch?v=xxxxx |

FIG. 18

Setup(1/3): APPARATUS INFORMATION

Check the device model and the device number, and select a region. After checking, press "Next" button.
*Required Fields Device Model — MFP001

Device Number — 3F69-XXXXXXX

*Installation Region — Select

FIG. 19

Setup(1/3): APPA...
Check the device model and...
*Required Fields

Device Model

Device Number

*Installation Re...

Installation Region (Scroll to view others)  — 136

○ ○ ○ ○ ○ ○ ○ ◉

Russia
South Africa
Spain
Sweden
Switzerland
Turkey
Great Britain
Japan

} 136a

Cancel — 136b    OK — 136c

FAX (Classic Mode)   Scanner (Classic Mode)

Next

Check Status    Stop

- FAX (Classic Mode)
- Scanner (Classic Mode)

Setup(2/3): Customer Information — Next

Enter the company name in which the apparatus is installed and the contact information of a person in charge. After entering the fields, press "Next" button.
*Required Fields

- *Company Name — 141

Person in Charge 1:

- *Name of Person in Charge — 142
- *Phone Number — 143
- *E-Mail Address — 144

Check Status    Stop

- FAX (Classic Mode)
- Scanner (Classic Mode)

Setup(2/3): Customer Information — Next

Person in Charge 1:

- *Name of Person in Charge — 142
- *Phone Number — 143
- *E-Mail Address — 144
- Department Name — 145

Person in Charge 2:

Check Status    Stop

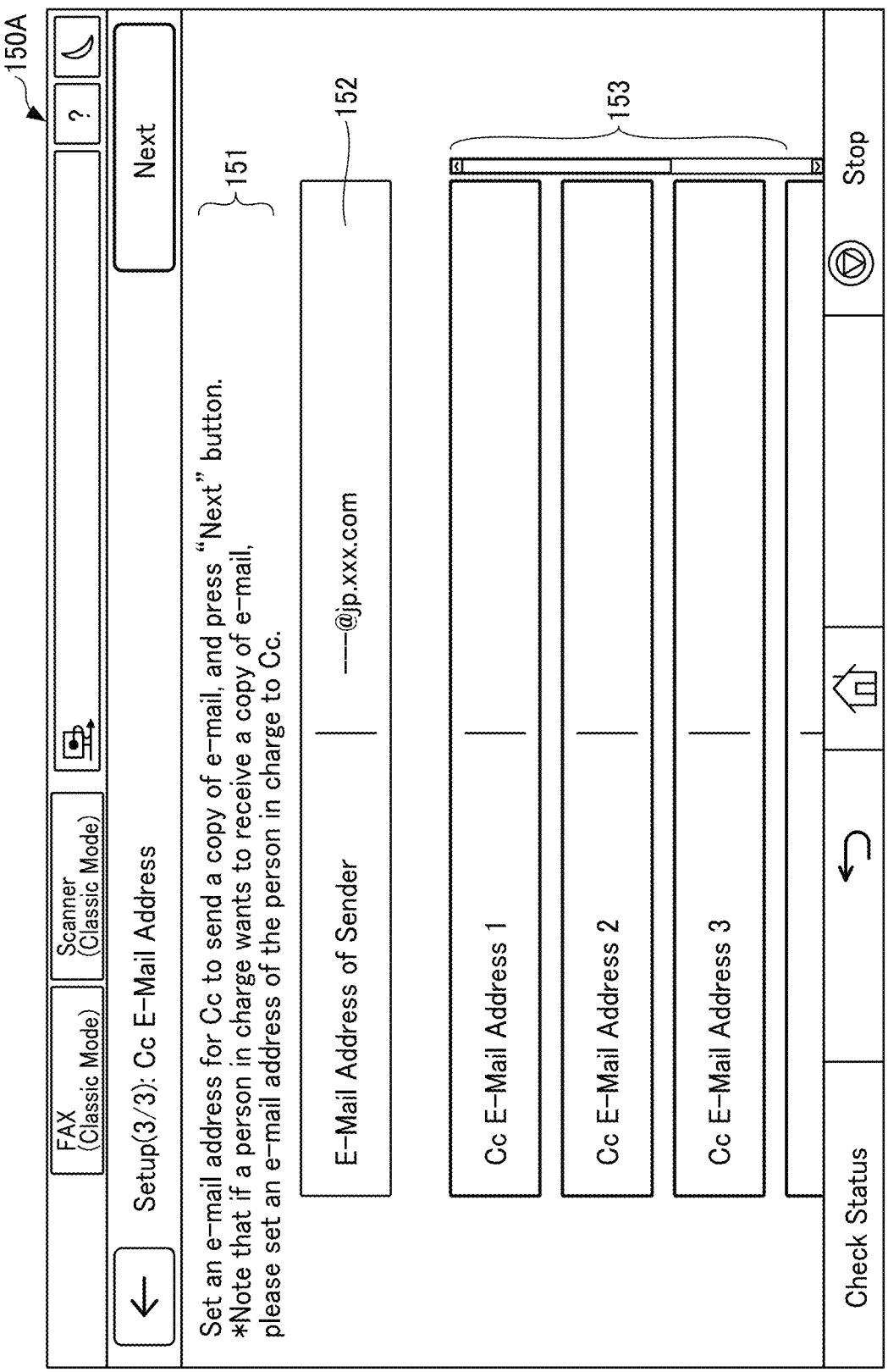

| Copy (Classic Mode) | | FAX | | |
|---|---|---|---|---|

Make Repair Request — 203
Execute Repair Request
? — 200

Previous Repair Request
2021/09/29 12:56:54 } 204  Cancel   Details — 205

Failed to send a fax

Please select the following fields.
*Required Fields

*Request Item — 201
Paper Jam
B

*Contact of Person in Charge — 202
Taro Patent
0123456789
----@jp.xxx.com
XX Department Check Status    ⇦  ↩    ▶    Stop

FIG. 30

| FAX (Classic Mode) | Scanner (Classic Mode) | | | Cancel | OK | 250 |

Request Item

Please select or enter the following fields.
*Required Fields

*Request Item — Select — 251

Remarks — Please enter additional explanation if any. — 252

Check Status — Stop

FIG. 32

Request Item

Please select or enter the following fields.
*Required Fields

*Request Item: Paper Jam B — 257a

Remarks: Please enter additional explanation if any. — 257b

Cancel    OK — 257c

257 → [?] [moon icon]

FAX (Classic Mode)    Scanner (Classic Mode)

Check Status    Stop

FIG. 36

Copy (Classic Mode) | FAX | | ? | OK
Request Item | | | | Cancel

Please select or enter the following fields.
*Required Fields

*Request Item
Service Call(SC)
SC521
— 341

Remarks
Please enter additional explanation, if any.
— 342

Check Status | ↶ | ⌂ | ⊳ | Stop

```
Copy
(Classic Mode)    FAX                                      ?    OK
                                                                        ╮260

Contact of Person in Charge                    Cancel

⦿  Name of Person in Charge: [Taro Patent]  │        │ ╮262
     Phone Number: [0123456789]               │        │
     E-Mail Address: [——@jp.xxx.com]          │        │
     Department Name: [XX Department]    ╮261 │        │

○  Other Persons in Charge

*Name of Person in Charge  │                │

*Phone Number              │                │

*E-Mail Address            │                │

↩    ⌂                  ▷       Stop
  Check Status
```

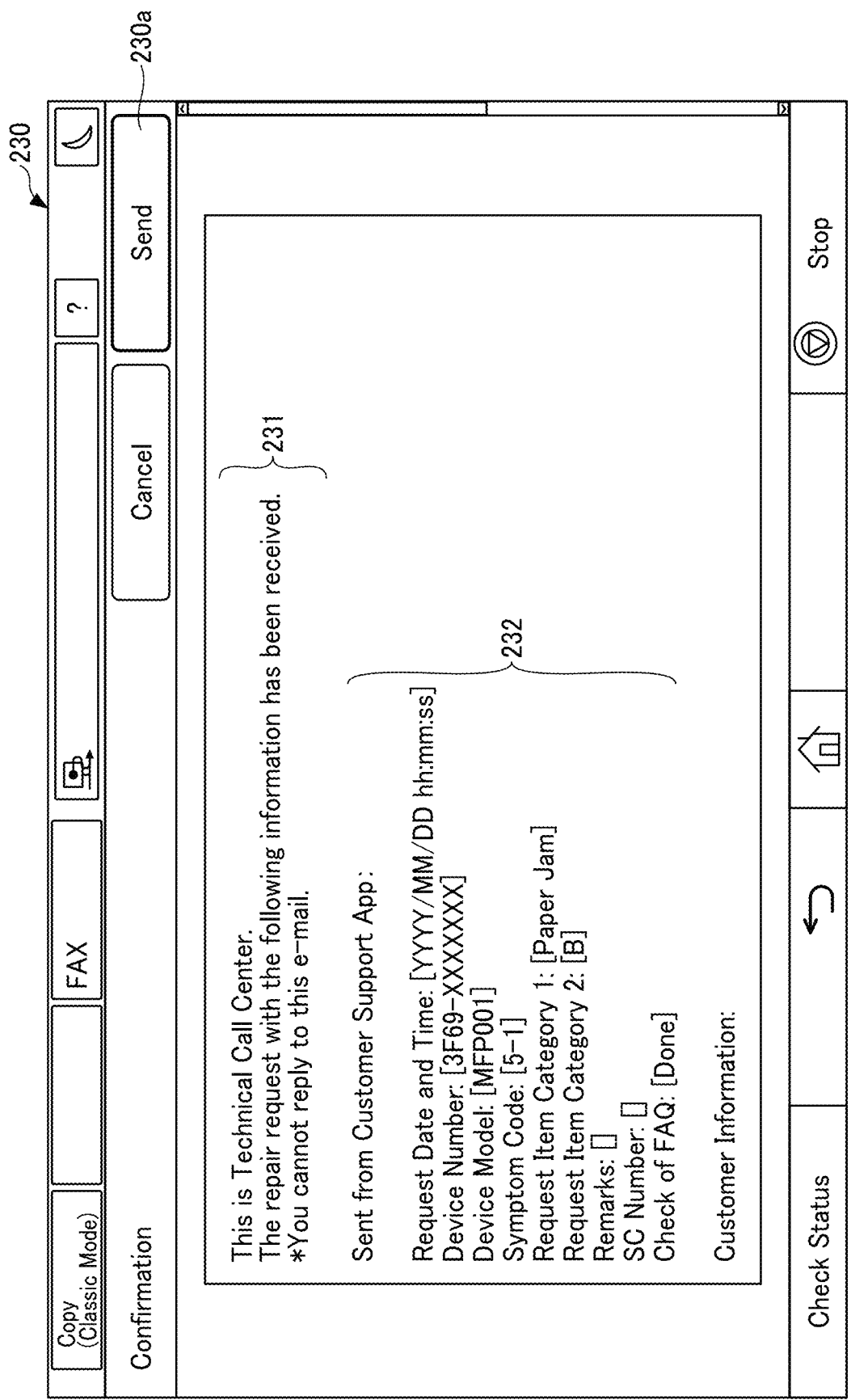

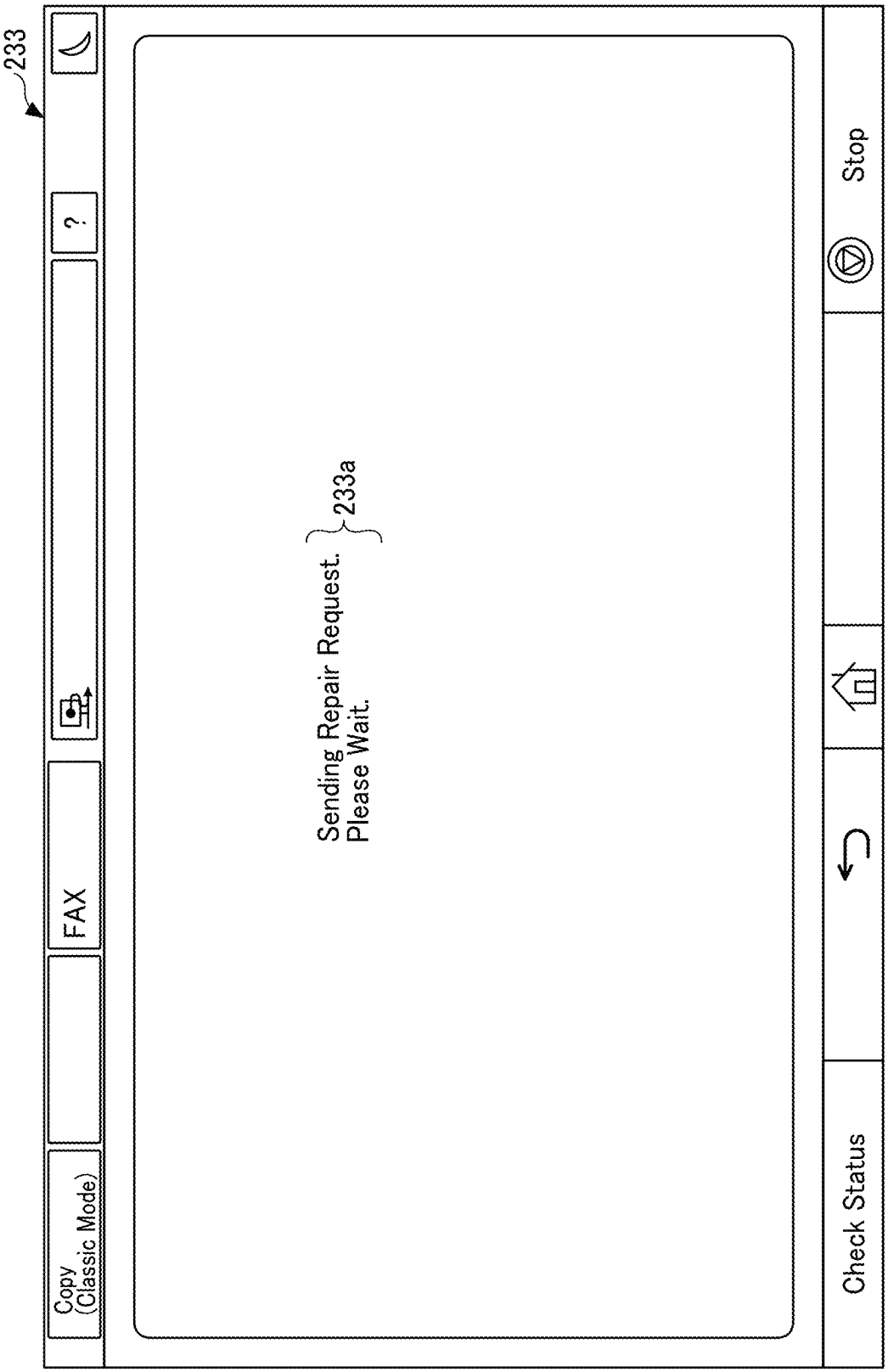

FIG. 50

| Item | Contents |
|---|---|
| 401 — Address of Sender | E-mail address unique to repair request application |
| 402 — Destination Address | To: E-mail address of Call Center Reception in "Region" set.<br>Cc: E-mail address set to CC by Customer |
| 403 — Subject | [Service Request] [serial number] [SC##] [Issue Category] [Issue Subcategory]<br>Example: [Service Request] [SC670000] [Abnormal Image] [Streak] — 405 |
| 404 — Main Text | This is Technical Call Center.<br>The repair request with the following information has been received.<br>Sent from Repair Request App:<br>Request Date and Time: [2021-03-18 15:27:21]<br>Device Number: [3F69-XXXXXXX]<br>Device Model: [MFP001]<br>Symptom Code: [5-1]<br>Symptom Category 1: [Paper Jam]<br>Symptom Category 2: [B]<br>Remarks: [Enter by User]<br>SC Number: [521]<br>Output of Troubleshooting Information: [Yes]   } 406<br>Customer Information:<br>Name of Person in Charge: [Taro Patent]<br>Phone Number: [0123456789]<br>E-Mail Address: [——@jp.xxx.com]<br>Company Name: [YY Co.]<br>Department Name: [XX Department]<br>Region: [Japan]   } 407<br>Additional Information on Apparatus:<br>Full-Color Counter: [12254]<br>Monochrome Counter: [5632]<br>---printer status---<br>Remaining of Tonner is Low: Cyan [10083]<br>Remaining of Tonner is Low: Yellow [10085]<br>No Paper: Tray 1 [13200]<br>Service Call: SC790 [40800]<br>---copy status---<br>Remaining of Tonner is Low: Cyan [10083]<br>Remaining of Tonner is Low: Yellow [10085]<br>No Paper: Tray 1 [13200]<br>---scan status---<br>No Information<br>---fax status---<br>No Paper: Tray 1 [13200]   } 408 |

APPARATUS, INFORMATION PROCESSING SYSTEM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-169764, filed on Oct. 15, 2021, in the Japan Patent Office, the entire disclosure of which is hereby incorporated by reference herein.

BACKGROUND

Technical Field

Embodiments of the present disclosure relate to an apparatus, an information processing system, and a non-transitory recording medium.

Related Art

When trouble, or a problem, such as, for example, a failure in an apparatus or running out of an expendable item used with the apparatus, occurs while a user is using the apparatus for scanning, copying, or printing out of a document, the user fails to continue to use the apparatus. When such a problem occurs in the apparatus, the user tries to fix the problem in relation to the apparatus by referring to an operation manual, for example, but this may just take time and effort.

A technique for displaying a moving image to fix a failure has been devised. A known image forming apparatus displays, on a display unit, a first maintenance screen including a moving image for work instructions for solving a maintenance event when an occurrence of the maintenance event is detected by a detection unit that detects the occurrence of the maintenance event occurred in the image forming apparatus.

SUMMARY

An embodiment of the present disclosure includes an apparatus including circuitry to receive an input of problem information that is information on a problem, transmit the problem information to an information processing apparatus communicably connected to the apparatus via a network, and receive, from the information processing apparatus, troubleshooting information corresponding to the problem information. The troubleshooting information is information for solving the problem. The circuitry outputs the troubleshooting information, and transmits, to an extraneous resource, a repair request including the problem information and information indicating whether the troubleshooting information has been output.

An embodiment of the present disclosure includes an information processing system including an apparatus and an information processing apparatus. The apparatus includes apparatus circuitry. The information processing apparatus is communicably connected to the apparatus via a network and includes information processing apparatus circuitry. The apparatus circuitry receives an input of problem information that is information on a problem, transmits, to the information processing apparatus, the problem information, and receives, from the information processing apparatus, troubleshooting information corresponding to the problem information. The troubleshooting information is information for solving the problem. The apparatus circuitry outputs the troubleshooting information and transmits, to an extraneous resource, a repair request including the problem information and information indicating whether the troubleshooting information has been output. The information processing apparatus circuitry transmits, to the apparatus, one of the troubleshooting information corresponding to the problem information and a storage destination of the troubleshooting information.

An embodiment of the present disclosure includes a non-transitory recording medium storing a plurality of instructions which, when executed by one or more processors, causes the processors to perform a method. The method includes receiving an input of problem information that is information on a problem, transmitting, to an information processing apparatus, the problem information, and receiving, from the information processing apparatus, troubleshooting information corresponding to the problem information. The troubleshooting information is information for solving the problem. The method includes outputting the troubleshooting information and transmitting, to an extraneous resource, a repair request including the problem information and information indicating whether the troubleshooting information has been output.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of setting information stored in a setting information storage unit according to the exemplary embodiment of the disclosure;

FIG. 7 is a diagram illustrating an example of a troubleshooting information determination table stored in a troubleshooting information storage unit according to the exemplary embodiment of the disclosure;

FIG. 18 is a diagram illustrating an example of an apparatus information setting screen according to the exemplary embodiment of the disclosure;

FIG. 19 is a diagram illustrating an example of a region setting window according to the exemplary embodiment of the disclosure;

FIGS. 20A and 20B are diagrams illustrating examples of a customer information setting screen (part 1) and a customer information setting screen (part 2), respectively, according to the exemplary embodiment of the disclosure;

FIG. 21 is a diagram illustrating an example of an e-mail carbon copy (CC) setting screen (part 1) according to the exemplary embodiment of the disclosure;

FIGS. 29A to 29C are diagrams illustrating examples of a repair request screen according to the exemplary embodiment of the disclosure;

FIG. 30 is a diagram illustrating an example of a request item setting screen according to the exemplary embodiment of the disclosure;

FIG. 32 is a diagram illustrating an example of a post-request-item-selection screen according to the exemplary embodiment of the disclosure;

FIG. 36 is a diagram illustrating an example of an abnormality display selection screen according to the exemplary embodiment of the disclosure;

FIG. 37 is a diagram illustrating an example of a contact setting screen according to the exemplary embodiment of the disclosure;

FIG. 39 a diagram illustrating an example of a repair request mail confirmation screen according to the exemplary embodiment of the disclosure;

FIG. 40 is a diagram illustrating an example of a repair request mail transmission screen according to the exemplary embodiment of the disclosure;

FIG. 50 is a diagram illustrating an example of information included in the repair request mail according to the exemplary embodiment of the disclosure.

Figure 1:
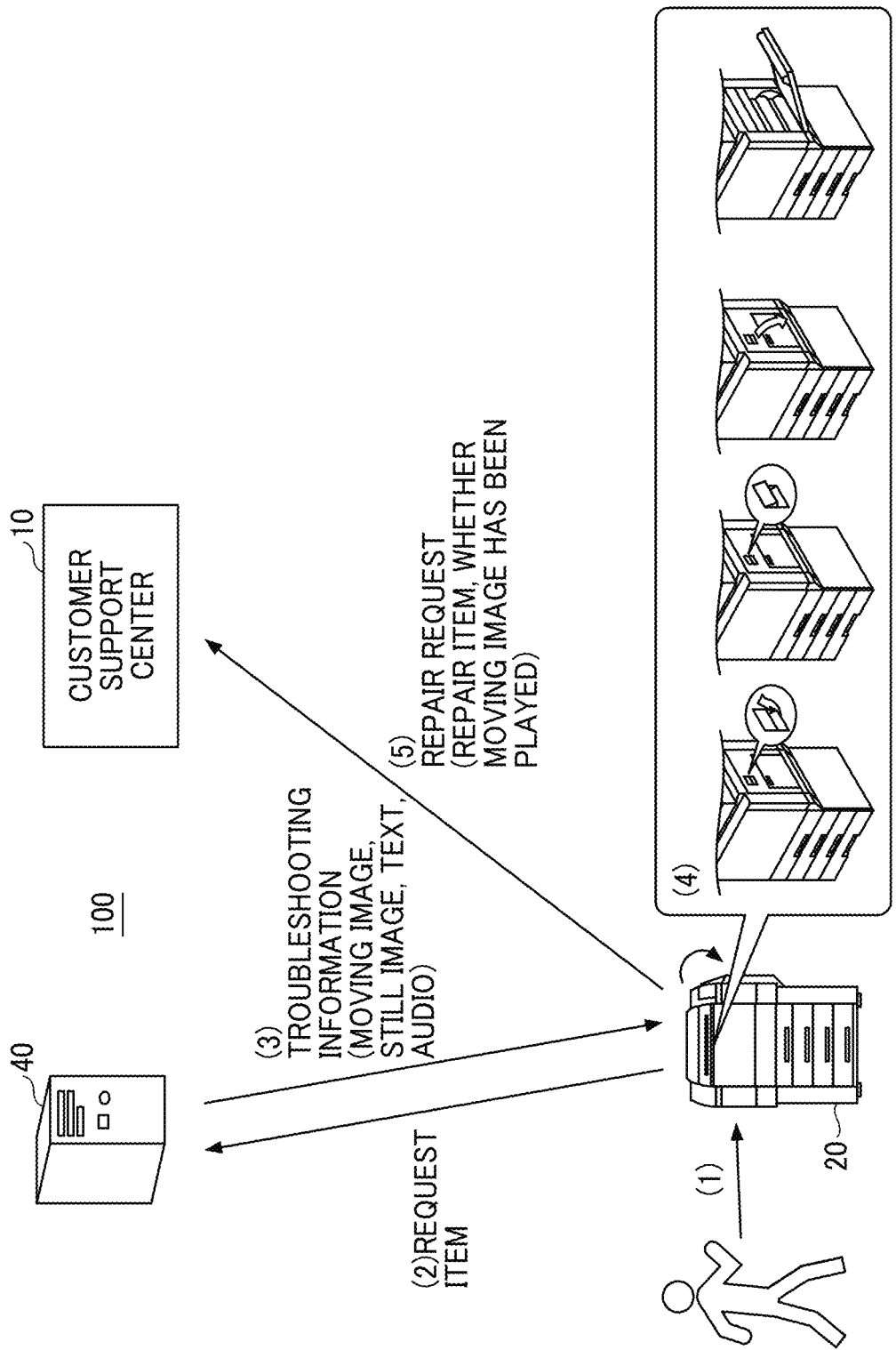
FIG. 1 is a diagram illustrating an outline of a procedure in which an apparatus transmits a repair request mail to an information processing apparatus in response to a user operation according to an exemplary embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of example embodiments of an information processing system and a method for troubleshooting performed by the information processing system with reference to the drawings.

Outline of Operation:

FIG. 1 is a diagram illustrating an outline of a procedure in which an apparatus 20 transmits a repair request mail to an information processing apparatus 40 in response to a user operation, according to an embodiment.

(1) A problem, or trouble, such as a deterioration in image quality or a paper jam occurs when a user operates the apparatus 20, such as an image forming apparatus. The user activates a repair request application that operates on the apparatus 20. According to a guidance of the repair request application, the user sets a request item for requesting in relation to the problem along with information indicating details of the problem (symptom or situation).

(2) The repair request application transmits the request item to the information processing apparatus 40.

(3) The information processing apparatus 40 transmits to the apparatus 20 troubleshooting information (for example, moving image, still image, text, or audio) corresponding to the request item.

(4) The repair request application outputs the troubleshooting information, and the user attempts to solve the problem by referring to the troubleshooting information.

(5) When the problem is not solved even with the troubleshooting information, the user inputs a repair request to the repair request application. The repair request application attaches the request item and information indicating whether the troubleshooting information has been output or not to the repair request and outputs the repair request to outside (extraneous resource). Outputting to the outside includes, for example, transmitting an electronic mail (e-mail) to a customer support center 10.

As described above, in the present embodiment, when a problem, or trouble, occurs in the apparatus 20, the troubleshooting information is provided for a user to attempt to fix the problem by himself or herself, and this allows the user to solve the problem by himself or herself as much as possible. This reduces frequency of traveling of a maintenance staff member to a problem occurring site. In addition, even when the problem, or the trouble, is not fixed with the troubleshooting information, the repair request including the attached request item and the information indicating whether the troubleshooting information has been output or not allows the maintenance staff member to recognize that the problem is not related to at least content of the troubleshooting information if the information indicates that the troubleshooting information has been output, thereby facilitating determination of solution that fixes the problem.

Terms:

The problem refers to a state or a situation in which a requested function is failed to be executed. It has a broad meaning of a bad condition or an abnormal state. The problem may be referred to as a failure, a malfunction, an abnormality, a defect, or an error, for example.

Problem information is information indicating what kind of problem has occurred.

In the present embodiment, the problem information is described by a term of "request item (category, subcategory)."

The troubleshooting information is information for solving the problem, and includes a method for solving the problem. The troubleshooting information can be provided in various modes of such as moving image, still image, text, and audio.

An external transmission destination of the repair request may be any information processing apparatus from which a staff member of customer support can acquire the repair request. In the present embodiment, a mail server will be described as an example.

Figure 2:
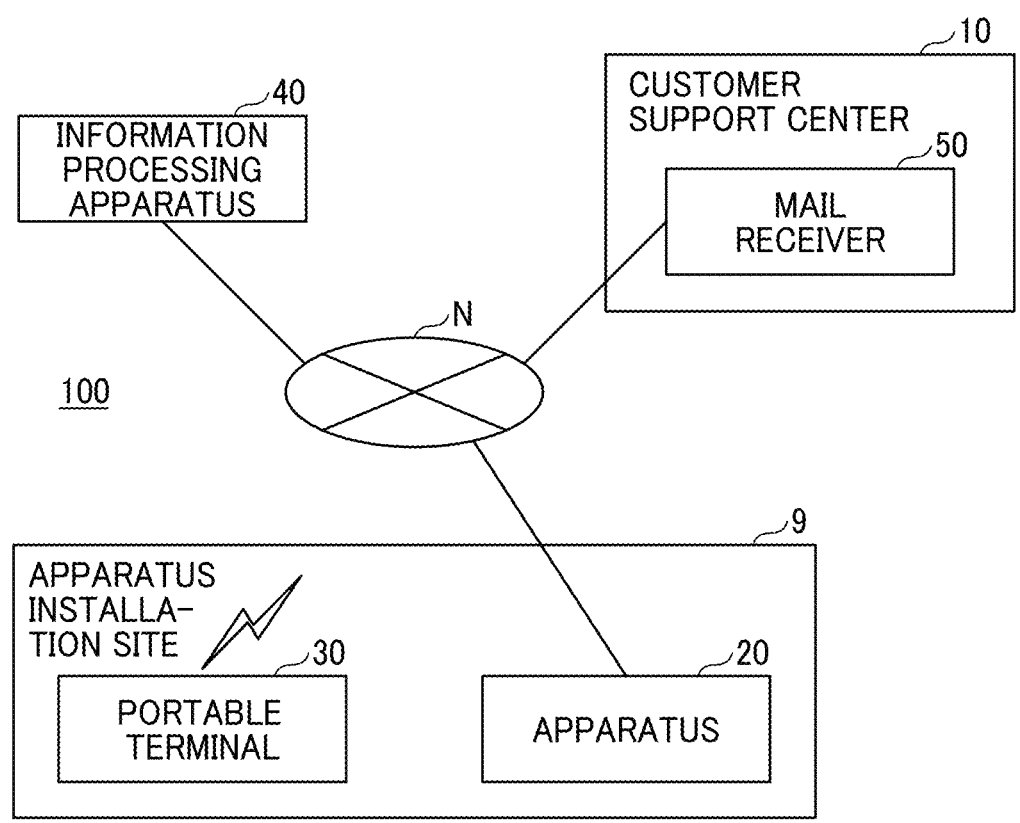
FIG. 2 is a block diagram illustrating an example of a system configuration of an information processing system according to the exemplary embodiment of the disclosure.

System Configuration:

A system configuration of an information processing system 100 according to the present embodiment is described below with reference to FIG. 2. FIG. 2 is a block diagram illustrating an example of the system configuration of the information processing system 100.

The information processing system 100 illustrated in FIG. 2 includes the information processing apparatus 40 and the apparatus 20 that are communicably connected to each other via a wide area network N such as the Internet. The information processing apparatus 40 and the apparatus 20 may not be always connected to the network N. A mail receiver 50 is also connected to the network N.

The apparatus 20 is installed in an apparatus installation site 9. The apparatus installation site 9 is, for example, an office of a company or a local government, a factory, a convenience store, or a public facility, but the apparatus 20 may be installed anywhere.

The apparatus 20 is any of various electronic devices used by a user. The apparatus 20 may be, for example, an image forming apparatus such as a multifunction peripheral (MFP), a projector, an electronic whiteboard, a video conference terminal, a digital signage, a head up display (HUD) device, an industrial machine, an imaging device, a sound collecting device, a medical device, a network home appliance, a game machine, a wearable personal computer (PC), or a desktop PC. In addition, the apparatus 20 may be any device that has a function with which an operating system (OS) operates and an application operates on the OS.

The application may be a web browser. The apparatus 20 can communicate with the information processing apparatus 40 via the network N. In addition, the apparatus 20 can transmit an e-mail to an outgoing mail server set in advance. Such a configuration allows the apparatus 20 to transmit an e-mail to a destination. In the present embodiment, one of the destinations is the mail receiver 50 of the customer support center 10.

The apparatus 20 may be supported for a tenant contract. The tenant is defined as an organization such as a company or a local government that has contracted to receive a service from a service provider (in the present embodiment, a sales company of the apparatus 20, for example). In this case, the apparatus 20 is registered in the information processing apparatus 40 and can receive a dispatch service of a customer engineer within a scope of the contract.

Further, a portable terminal 30 is present in the apparatus installation site 9. The portable terminal 30 is, for example, a smartphone carried by the user of the apparatus 20. The portable terminal 30 may be common to each user. The portable terminal 30 may be used to output the troubleshooting information. A control panel of the apparatus 20 is typically placed away from a door or a paper tray to be opened by the user in order to solve a problem, and due to this, the user has difficulty to work for solving the problem while browsing the troubleshooting information. In the present embodiment, the portable terminal 30 can display the troubleshooting information, the user can work for solving the problem while browsing the troubleshooting information.

The information processing apparatus 40 is implemented by one or more computers, and provides a service related to troubleshooting, or a form of problem solving, to the apparatus 20 via the network N. For example, the information processing apparatus 40 transmits to the apparatus 20 frequently asked questions (FAQ) or the troubleshooting information corresponding to the request item transmitted from the apparatus 20.

The information processing apparatus 40 may transmit content itself to the apparatus 20 as the troubleshooting information, or may transmit a uniform resource locator (URL) of the troubleshooting information to the apparatus 20. In case of transmitting the URL, the information processing apparatus 40 does not need to hold the content of the troubleshooting information, and a content server may hold the content.

The information processing apparatus 40 may be implemented by cloud computing or may be implemented by a single information processing apparatus 40. The term "cloud computing" refers to the availability of resources on a network without identifying specific hardware resources. The information processing apparatus 40 may reside on the Internet or on-premises.

The mail receiver 50 is provided in the customer support center 10. The mail receiver 50 can be carried by each customer engineer. The mail receiver 50 is connected to an incoming mail server set in advance and receives an e-mail of which a destination is set to the mail receiver 50. In the present embodiment, the repair request is described in the e-mail.

The mail receiver 50 may be a general-purpose information processing apparatus 40 on which mail receiving software operates. The mail receiver 50 is, for example, a PC, a smartphone, a tablet terminal, or a personal digital assistant (PDA), and may be any device on which a mail receiving software operates.

Hardware Configuration:

A hardware configuration of each of the information processing apparatus 40 and the apparatus 20 included in the information processing system 100 according to the present embodiment is described below with reference to FIGS. 3 and 4.

Figure 3:
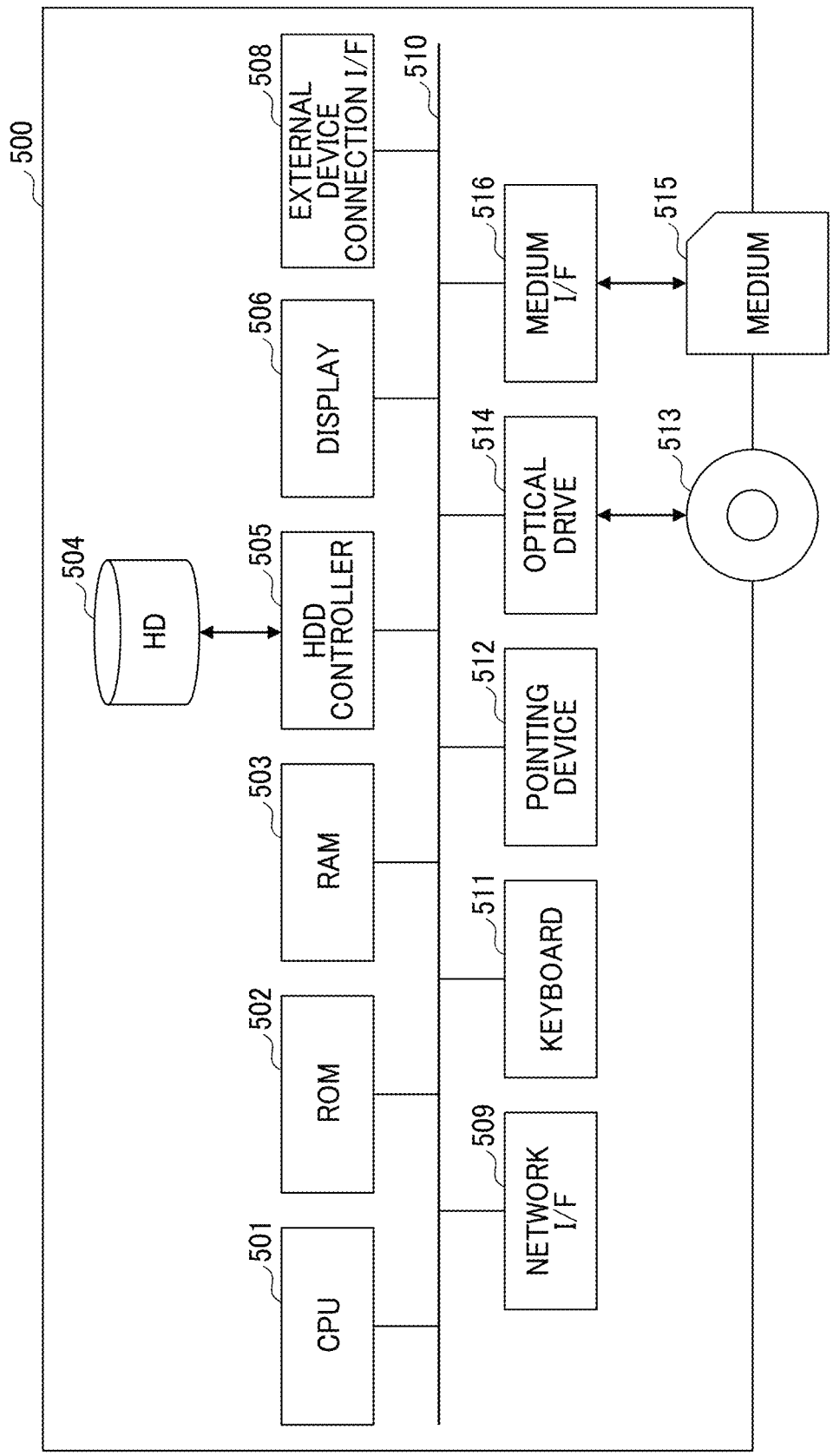
FIG. 3 is a block diagram illustrating an example of a hardware configuration of the information processing apparatus according to the exemplary embodiment of the disclosure.

Information Processing Apparatus:

FIG. 3 is a block diagram illustrating an example of a hardware configuration of the information processing apparatus 40 according to the present embodiment. A hardware configuration of the mail receiver 50 or the portable terminal 30 may be substantially the same as or different from that illustrated in FIG. 3. Even if the mail receiver 50 or the portable terminal 30 has a hardware configuration different from that illustrated in FIG. 3, a description of the present embodiment is given under the assumption that such differences are insignificant.

As illustrated in FIG. 3, the information processing apparatus 40 is implemented by a computer 500. The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls entire operation of the computer 500. The ROM 502 stores programs such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface that connects to various external devices. Examples of the external devices include, but not limited to, a universal serial bus (USB) memory and a printer. The network I/F 509 is an interface for performing data communication using the network N. The bus line 510 is an address bus, a data bus, or the like for electrically connecting the components such as the CPU 501 illustrated in FIG. 3 each other.

The keyboard 511 is an example of an input device provided with a plurality of keys used to input characters, numerals, or various instructions. The pointing device 512 is an example of an input device that allows a user to select or execute various instructions, select an item for processing, or move a cursor being displayed. The optical drive 514 controls reading or writing of various data from or to an optical recording medium 513, which is an example of a removable recording medium. Examples of the optical storage medium include, but not limited to a compact disc (CD), a digital versatile disc (DVD), and BLU-RAY (registered trademark). The medium I/F 516 controls reading and writing (storing) of data from and to a recording medium 515 such as a flash memory.

Figure 4:
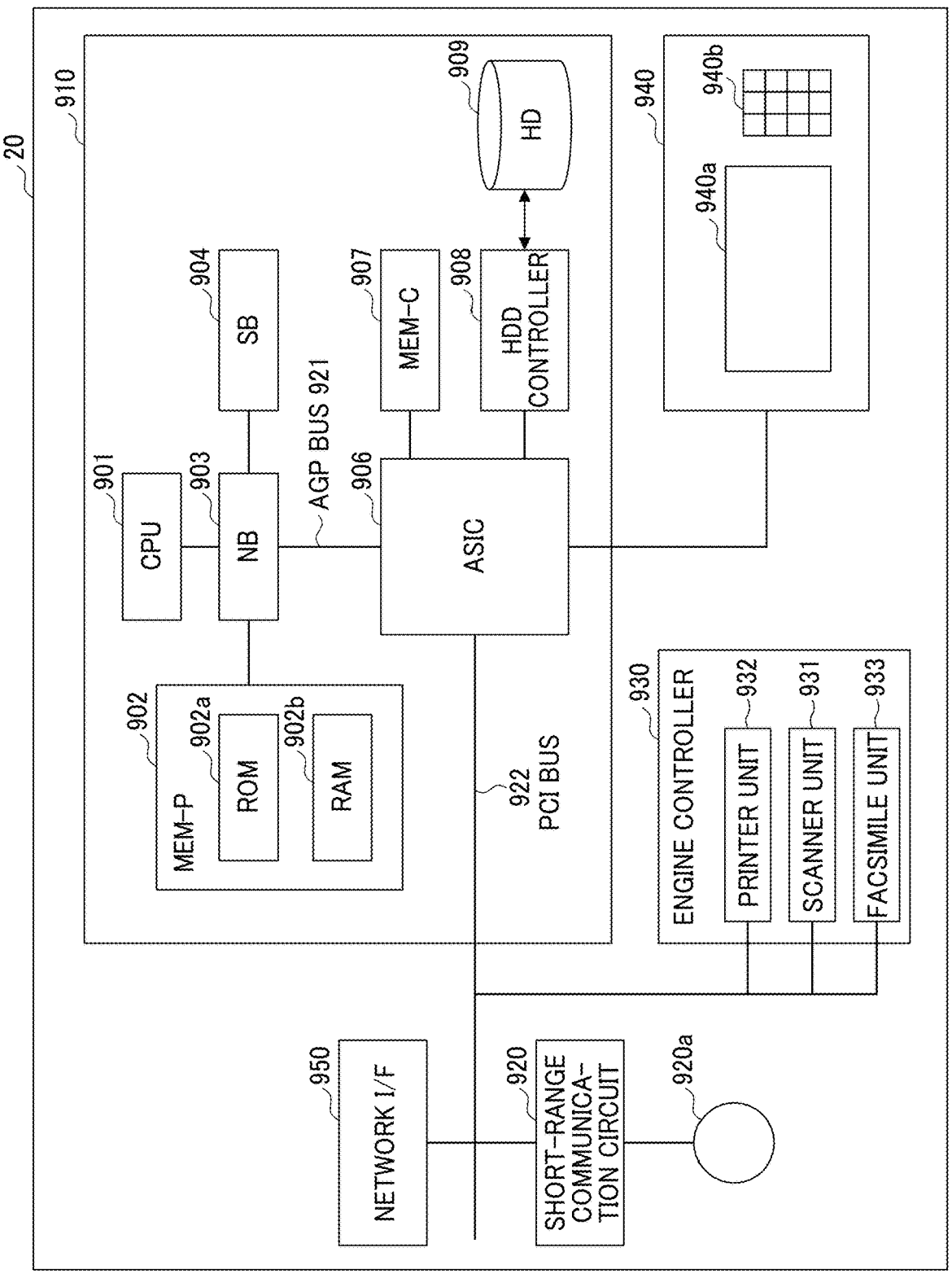
FIG. 4 is a block diagram illustrating an example of a hardware configuration of an image forming apparatus, which is an example of the apparatus according to the exemplary embodiment of the disclosure.

Apparatus:

FIG. 4 is a block diagram illustrating an example of a hardware configuration of an image forming apparatus, which is an example of the apparatus 20. As illustrated in FIG. 4, the image forming apparatus includes a controller 910, a short-range communication circuit 920, an engine controller 930, a control panel 940, and a network interface I/F 950.

The controller 910 includes a CPU 901 as a main processor, a system memory (MEM-P) 902, a north bridge (NB) 903, a south bridge (SB) 904, an application specific integrated circuit (ASIC) 906, a local memory (MEM-C) 907, an HDD controller 908, and an HD 909 as a storage unit. The NB 903 and the ASIC 906 are connected through an accelerated graphics port (AGP) bus 921.

The CPU 901 is a controller that controls entire operation of the image forming apparatus. The NB 903 connects the CPU 901, with the MEM-P 902, the SB 904, and the AGP bus 921. The NB 903 includes a memory controller for controlling reading or writing of various data with respect to the MEM-P 902, a peripheral component interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage (recording) medium, such as a compact disc-read only memory (CD-ROM), compact disc-recordable (CD-R), or DVD, in a file format installable or executable by the computer, for distribution.

The SB 904 is a bridge that connects the NB 903 to a PCI device or a peripheral device. The ASIC 906 is an integrated circuit (IC) dedicated to an image processing use, and connects the AGP bus 921, a PCI bus 922, the HDD controller 908, and the MEM-C 907.

The ASIC 906 includes a PCI target, an AGP master, an arbiter (ARB) that is the core of the ASIC 906, a memory controller that controls the MEM C907, a plurality of direct memory access controllers (DMACs) that performs image rotation using hardware logic, and a PCI unit that performs data transmission with a scanner unit 931, a printer unit 932, and a facsimile unit 933 via the PCI bus 922. The ASIC 906 may have a USB interface, or the Institute of Electrical and Electronics Engineers 1394 (IEEE1394) interface.

The MEM-C 907 is a local memory used as a buffer for image data to be copied or a code buffer. The HD 909 stores various image data, font data for printing, and form data. The HD 909 controls the reading or writing of data from or to the HD 909 under the control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with a near field communication (NFC) or the BLUETOOTH (registered trademark), for example.

The engine controller 930 includes the scanner unit 931, the printer unit 932, and the facsimile unit 933. The control panel 940 includes a panel display 940a and a hard key 940b. The panel display 940a is implemented by, for example, a touch panel that displays current settings or a selection screen to receive a user input. The hard key 940b includes a numeric keypad that receives set values of various image forming parameters such as image density parameter and a start key that receives an instruction for starting copying. The controller 910 controls overall operation of the image forming apparatus. For example, the controller 910 controls drawing, communication, or user inputs to the control panel 940. The scanner unit 931 and the printer unit 932 each performs various image processing, such as error diffusion or gamma conversion.

In response to an instruction to select a specific application through the control panel 940, for example, using a mode switch key, the image forming apparatus selectively performs a document box function, a copy function, a print function, and a facsimile function. The image forming apparatus enters a document box mode in response to a user selection of the document box function, enters a copy mode in response to a user selection of the copy function, enters a printer mode in response to a user selection of the print function, and enters a facsimile mode in response to a user selection of the facsimile mode.

The network I/F 950 is an interface for performing data communication using the network N. The short-range communication circuit 920 and the network I/F 950 are electrically connected to the ASIC 906 through the PCI bus 922.

Figure 5:
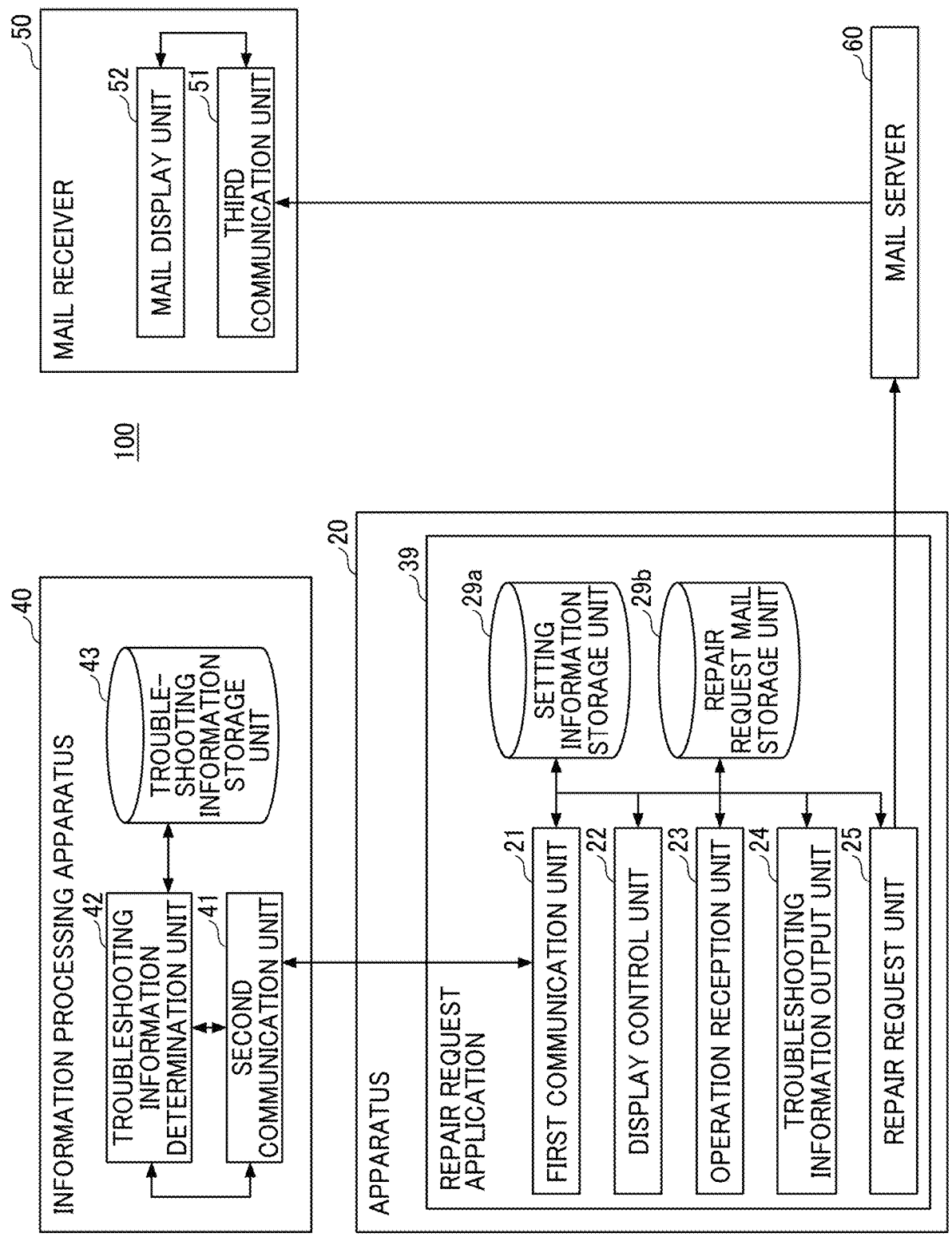
FIG. 5 is a block diagram illustrating an example of a functional configuration of the information processing system according to the exemplary embodiment of the disclosure.

Functions:

A functional configuration of the information processing system 100 according to the present embodiment is described below with reference to FIG. 5. FIG. 5 is a block diagram illustrating an example of the functional configuration of the information processing system 100 according to the present embodiment.

Apparatus:

The apparatus 20 includes a first communication unit 21, a display control unit 22, an operation reception unit 23, a troubleshooting information output unit 24, a repair request unit 25, a setting information storage unit 29a, and a repair request mail storage unit 29b. Each of these functional units included in the apparatus 20 is implemented by the CPU 901 of FIG. 4 executing an instruction included in one or more programs (repair request application 39) installed on the apparatus 20.

The first communication unit 21 transmits and receives various information to and from the information processing apparatus 40. In the present embodiment, the first communication unit 21 transmits to the information processing apparatus 40 a request item related to a problem. In addition, the first communication unit 21 receives the FAQ and the troubleshooting information corresponding to the request item from the information processing apparatus 40.

The display control unit 22 arranges the information received from the information processing apparatus 40 as display components that are held in advance, and displays various screens, which are described later, on the panel display 940a.

The operation reception unit 23 receives various operations of the user on the various screens displayed on the panel display 940a.

The troubleshooting information output unit 24 outputs the troubleshooting information. When the troubleshooting information is a moving image, streaming reproduction is performed, when the troubleshooting information is a still image, the image is displayed, when the troubleshooting information is represented by text, characters corresponding to the text is displayed, and when the troubleshooting information is represented by audio, the audio is reproduced with a speaker.

The repair request unit 25 transmits to a mail server 60 a repair request to which information indicating whether the troubleshooting information has been output or not is attached.

The functions of the apparatus 20 may be provided as a web application. The web application refers to software or a mechanism that is executed on the web browser and operates by coordinating a program in a programming language (for example, JAVASCRIPT (registered trademark)) that operates on the web browser with a program on the web server. The functions of the apparatus 20 may be provided by a dedicated application (native application).

The setting information storage unit 29a and the repair request mail storage unit 29b are implemented by the HD 909 illustrated in FIG. 4, for example. The repair request mail storage unit 29b stores the repair request mails transmitted to the mail server. An example of the repair request mail is illustrated in FIG. 50.

FIG. 6 is a diagram illustrating an example of setting information stored in the setting information storage unit 29a. As will be described later, the user sets various setting information in a repair request application 39. The setting information is stored in the setting information storage unit 29*a*.

The setting information includes, for example, information on device number, model name, name of person in charge, phone number, e-mail address, company name, department name, and region.

The device number is a device number (for example, a serial number) of the apparatus 20.

The model name is, for example, a product name of the apparatus 20.

The name of person in charge is a name of a person in charge of the repair request application 39 (for example, an employee belonging to a system information department).

The phone number is a telephone number of the person in charge.

The e-mail address is a mail address of the person in charge.

The company name is a company name of, for example, a company that owns the apparatus 20.

The department name is a department name that uses the apparatus 20.

The region is an installation location of the apparatus 20 indicated by country or region name.

Information Processing Apparatus:

Referring again to FIG. 5, the information processing apparatus 40 includes a second communication unit 41, a troubleshooting information determination unit 42, and a troubleshooting information storage unit 43. Each of the functional units included in the information processing apparatus 40 is implemented by the CPU 501 of FIG. 3 executing an instruction included in one or more programs installed on the information processing apparatus 40.

One or more of the functions of the information processing apparatus 40 may be divided into a plurality of information processing apparatuses 40. In addition, the information processing apparatus 40 may have a function of a content server that holds the content of the troubleshooting information, or a content server may be separately provided.

The second communication unit 41 transmits and receives various types of information to and from the apparatus 20. In the present embodiment, the second communication unit 41 receives a request item related to a problem from the apparatus 20. Further, the second communication unit 41 transmits the troubleshooting information corresponding to the request item to the apparatus 20.

The troubleshooting information determination unit 42 determines troubleshooting information corresponding to request content. There are mainly two methods for determining the troubleshooting information. One is a method of preparing a table in which the request items are associated with the troubleshooting information. In the present embodiment, a method using such a table is mainly described.

The other method is a method in which a classification device that has learned a relationship between a request item and troubleshooting information by machine learning is prepared, and the classification device determines N pieces of troubleshooting information having high probabilities with respect to the request item. For example, in the machine learning using deep learning, the classification device learns a weight between neurons using the request item as an input, identification information on the troubleshooting information as an output, and identification information on appropriate troubleshooting information as a teacher signal. By learning, the classification device outputs the probability of the identification information of each troubleshooting information with respect to the request item.

The machine learning is a technique for causing a computer to acquire human-like learning capability, and refers to a technique in which a computer autonomously generates an algorithm necessary for determination of data identification or the like from learning data acquired in advance, and applies the algorithm to new data to perform prediction. Any suitable learning method is applied for machine learning, for example, any one of supervised learning, unsupervised learning, semi-supervised learning, reinforcement learning, and deep learning, or a combination of two or more those learning. Machine learning methods include, but not limited to, perceptron, support vector machine, logistic regression, naive Bayes, decision tree, and random forest.

The troubleshooting information storage unit 43 is implemented by the HD 504 or the RAM 503 illustrated in FIG. 3. FIG. 7 is a diagram illustrating an example of a troubleshooting information determination table stored in the troubleshooting information storage unit 43. The troubleshooting information determination table is a table that holds the URL of the troubleshooting information corresponding to the request item. The troubleshooting information determination table includes items of category identification information (ID), category name, subcategory ID, subcategory name, symptom code, FAQ, and URL.

The category ID is a large classification of a problem (symptom or situation).

The category name is a name used by the user to identify a category of the category ID.

The subcategory ID is a small classification of a problem (symptom or situation).

The subcategory name is a name used by the user to identify a subcategory of the subcategory ID.

Since the request item is specified by hierarchically classifying the problem, the request item is easily organized by classifying the request item into the large classification and the small classification. For example, if the category is paper jam, where in the main body the paper jam occurred is a subcategory.

The symptom code is information in which the category ID and the subcategory ID are linked, and corresponds to identification information of the request item. Although there are two hierarchies in FIG. 7, there may be one hierarchy or three or more hierarchies.

The FAQ is a collection of frequently asked questions and the corresponding answers or responses. In the present embodiment, an inquiry list, which is a list of one or more inquiries, that may be useful for solving problems is set in advance. In the example of FIG. 7, one FAQ is prepared for each symptom code, but more than one FAQs are often prepared for each symptom code. Each FAQ in the example of FIG. 7 has a question alone, but the answer, or the response, corresponding to each FAQ is also prepared. The answer or the response corresponds to the troubleshooting information.

A URL is provided as one method for providing the answer.

The URL is a storage destination of the troubleshooting information. The URL may be a file path, for example. In alternative to the URL, the troubleshooting information itself may be transmitted to the apparatus 20.

Mail Receiver:

Referring again to FIG. 5, the mail receiver 50 includes a third communication unit 51 and a mail display unit 52. Each of the functional units included in the mail receiver 50 is implemented by the CPU 501 of FIG. 3 executing an instruction included in one or more programs installed on the mail receiver 50.

The third communication unit 51 is connected to the mail server 60 and receives an e-mail of which a destination is set to an e-mail address of the own device in advance. The mail display unit 52 displays the e-mail on a display, for example.

Example of Screen Transition:

An overall flow of a screen transition of the repair request application 39 and each screen are described below with reference to FIGS. 8 to 10.

Figure 8:
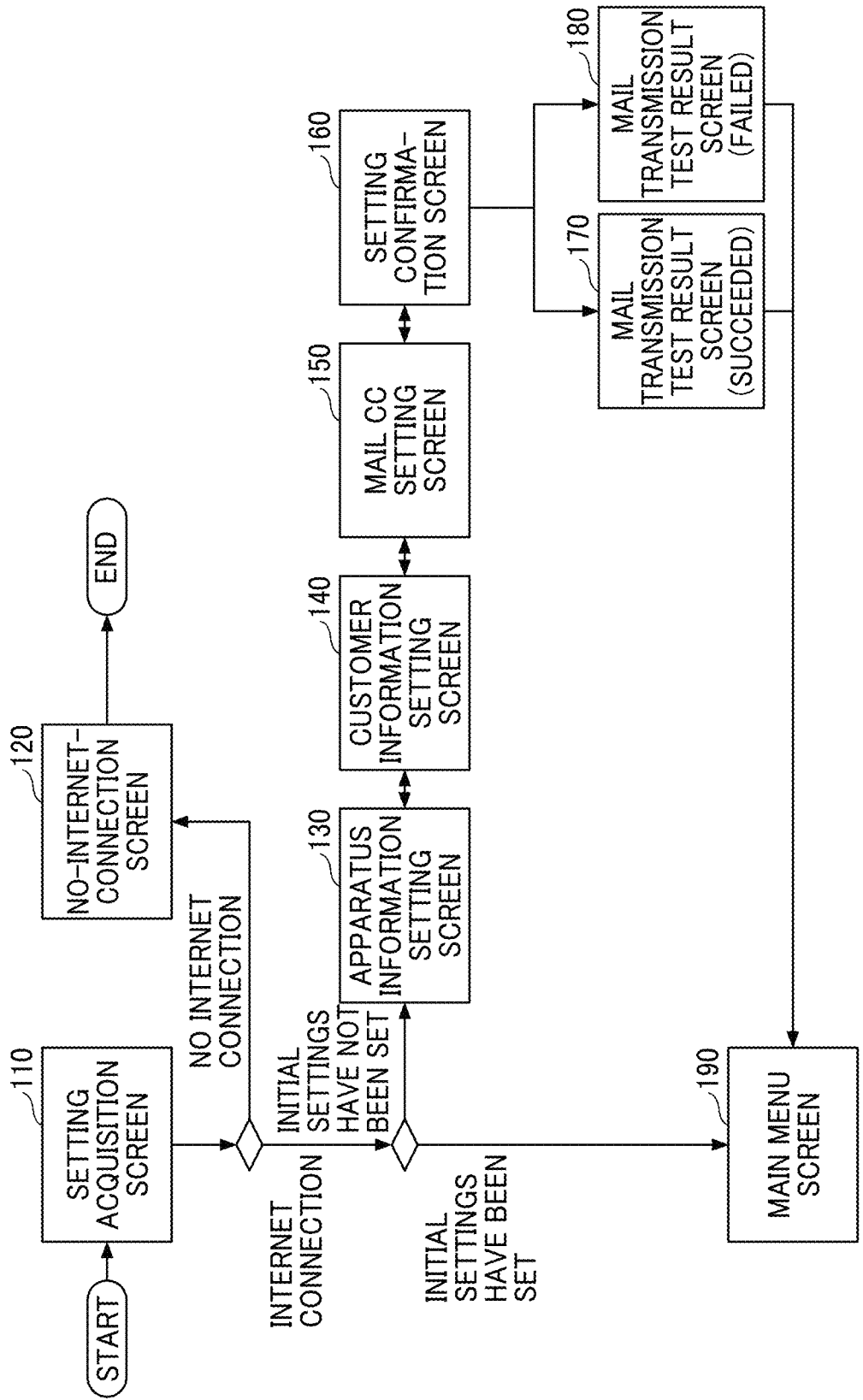
FIG. 8 is a diagram illustrating a screen transition when a repair request application is activated according to the exemplary embodiment of the disclosure.

FIG. 8 is a diagram illustrating a screen transition when the repair request application 39 is activated. When the repair request application 39 is activated, a screen transitions to a setting acquisition screen 110.

When no Internet connection is established, the setting acquisition screen 110 transitions to a no-Internet-connection screen 120.

When an Internet connection is established and initial settings have not been configured, the setting acquisition screen 110 transitions to an apparatus information setting screen 130. The apparatus information setting screen 130 transitions to a customer information setting screen 140. The customer information setting screen 140 transitions to an e-mail carbon copy (CC) setting screen 150. The e-mail CC setting screen 150 transitions to a setting confirmation screen 160. The e-mail CC setting screen 150 transitions to a mail transmission test result screen (succeeded) 170 or a mail transmission test result screen (failed) 180.

When an Internet connection is established and the initial settings have been configured, the setting acquisition screen 110 transitions to a main menu screen 190. Each of the mail transmission test result screen (succeeded) 170 and the mail transmission test result screen (failed) 180 transitions to the main menu screen 190. The main menu screen 190 is a screen serving as a starting point for the repair request.

Figure 9:
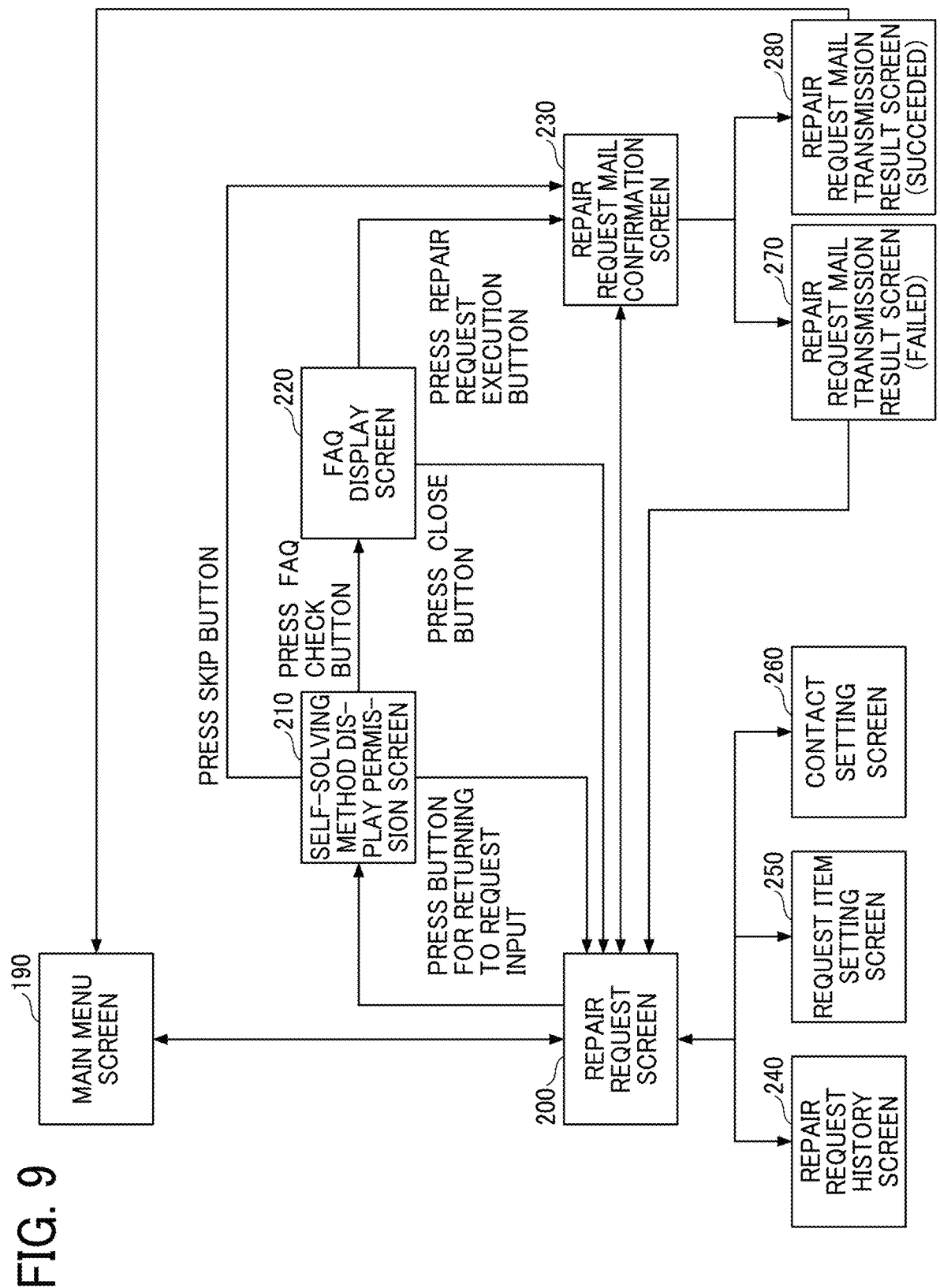
FIG. 9 is a diagram illustrating a screen transition when a repair request is performed using the repair request application according to the exemplary embodiment of the disclosure.

FIG. 9 is a diagram illustrating a screen transition when the repair request is performed using the repair request application 39. The main menu screen 190 transitions to a repair request screen 200. The repair request screen 200 transitions to a repair request history screen 240, a request item setting screen 250, or a contact setting screen 260.

The repair request screen 200 transitions to a self-solving method display permission screen 210, and the self-solving method display permission screen 210 transitions to an FAQ display screen 220 or a repair request mail confirmation screen 230. The repair request screen 200 and the FAQ display screen 220 transition to the repair request mail confirmation screen 230. The repair request mail confirmation screen 230 transitions to a repair request mail transmission result screen (succeeded) 280 or a repair request mail transmission result screen (failed) 270.

The repair request mail transmission result screen (succeeded) 280 transitions to the repair request screen 200. The repair request mail transmission result screen (failed) 270 transitions to the main menu screen 190.

Figure 10:
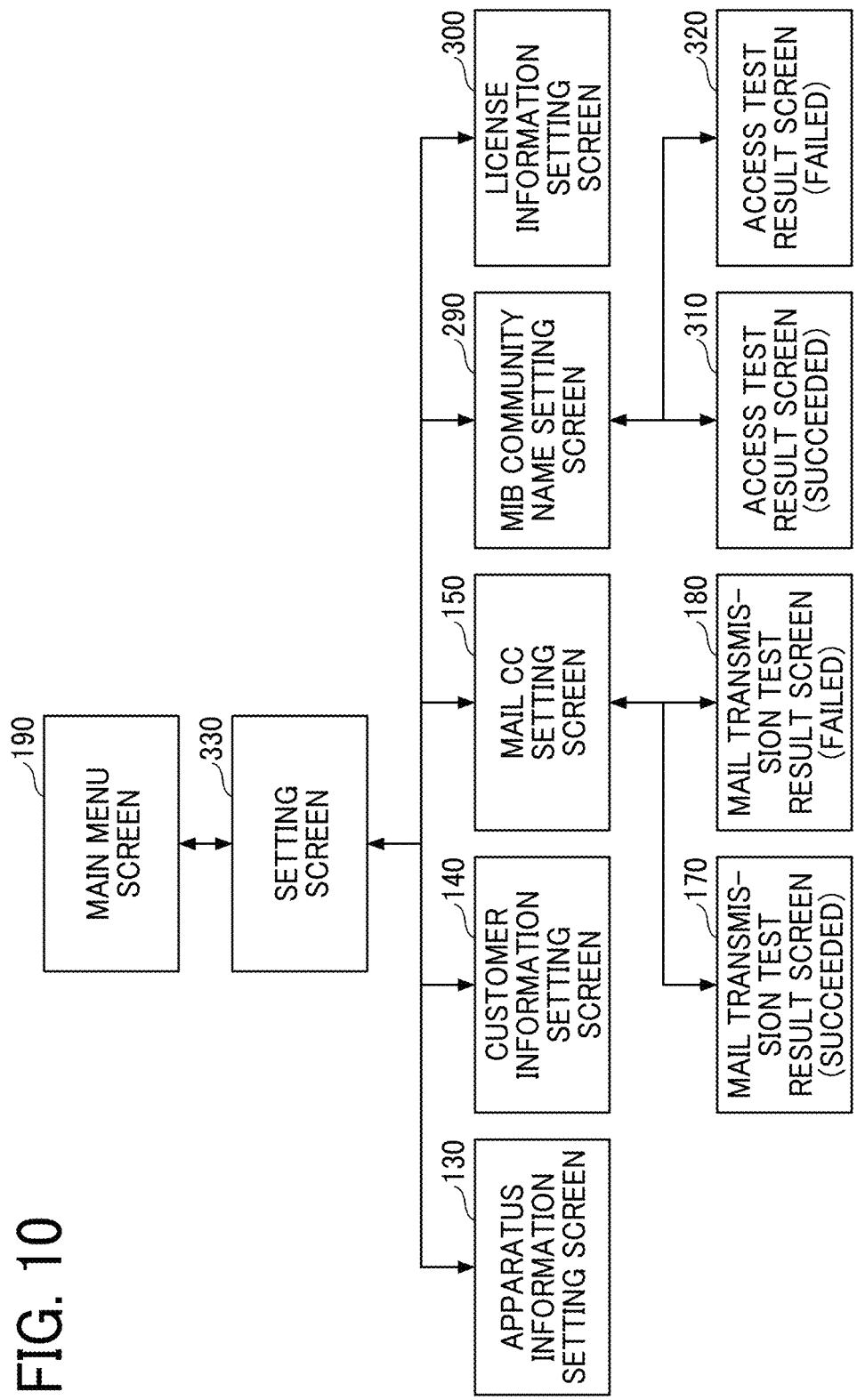
FIG. 10 is a diagram illustrating a screen transition when information is set for the repair request application according to the exemplary embodiment of the disclosure.

FIG. 10 is a diagram illustrating a screen transition when information is set for the repair request application 39.

The main menu screen 190 transitions to a setting screen 330.

The setting screen 330 transitions to the apparatus information setting screen 130, the customer information setting screen 140, the e-mail CC setting screen 150, a management information base (MIB) community name setting screen 290, and a license information screen 300.

The e-mail CC setting screen 150 transitions to a mail transmission test result screen (succeeded) 170 or a mail transmission test result screen (failed) 180. The MIB community name setting screen 290 transitions to an access test result screen (succeeded) 310 and an access test result screen (failed) 320.

Screen in Activating Repair Request Application:

A person who operates with respect to the following screens is a user who works in a company in which the apparatus 20 is installed, and the user may include an administrator. In addition, customer engineer may perform setting for the repair request application 39.

Figure 11:
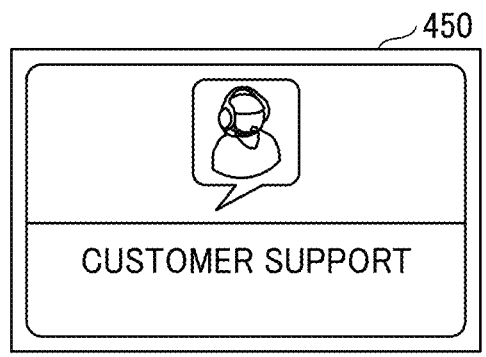
FIG. 11 is a diagram illustrating an example of an activation icon for the repair request application according to the exemplary embodiment of the disclosure.

FIG. 11 is a diagram illustrating an example of an activation icon for the repair request application 39. When the user presses an activation icon 450, the repair request application 39 is activated.

Figure 12:
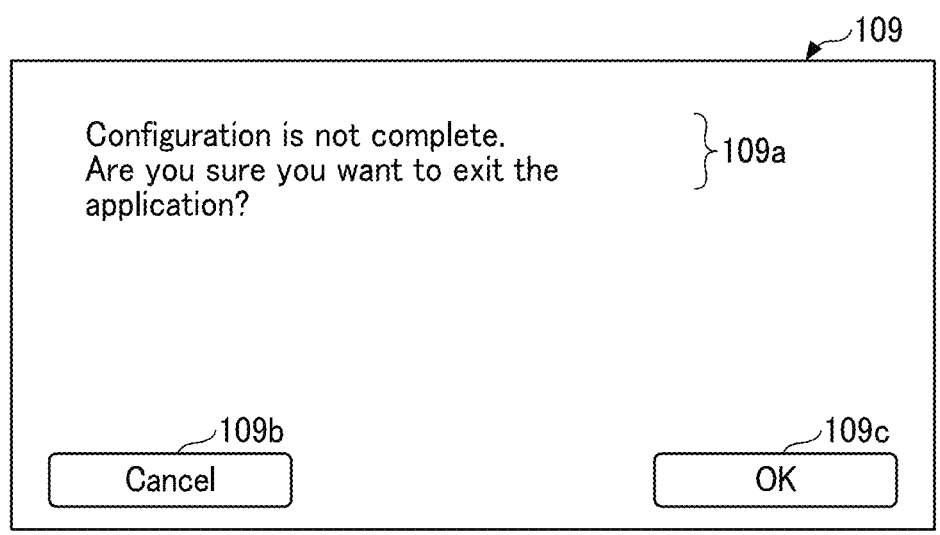
FIG. 12 is a diagram illustrating an example of an application termination confirmation screen displayed immediately after start of the repair request application according to the exemplary embodiment of the disclosure.

FIG. 12 is a diagram illustrating an example of an application termination confirmation screen 109 displayed immediately after the start of the repair request application 39. The repair request application 39 determines whether the initial settings has been configured after the activation, and displays the application termination confirmation screen 109 when the configuration of the initial settings is not completed. The application termination confirmation screen 109 includes a message 109a indicating, for example, "Configuration is not complete. Are you sure you want to exit the application?," a cancel button 109b, and an OK button 109c The cancel button is a button for continuing setting for the initial settings, and the OK button is a button for closing the application termination confirmation screen 109. In response to the cancel button 109b being pressed, the application termination confirmation screen 109 transitions to the setting acquisition screen 110 of FIG. 13.

Figure 13:
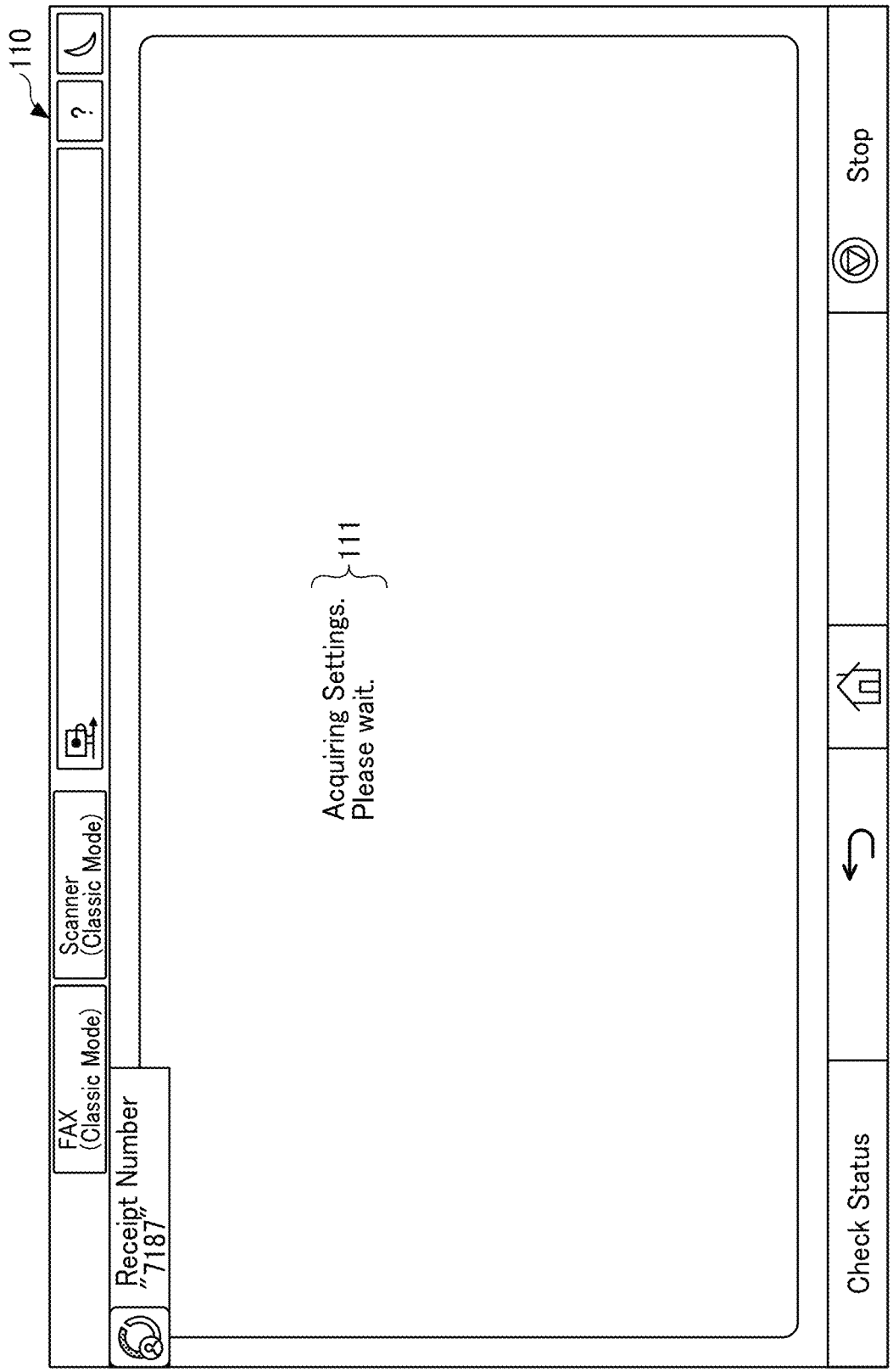
FIG. 13 is a diagram illustrating an example of a setting acquisition screen according to the exemplary embodiment of the disclosure.

FIG. 13 is a diagram illustrating an example of the setting acquisition screen 110. The setting acquisition screen 110 is a screen displayed while the apparatus 20 reads (obtains) the settings from, for example, the HD 504. The setting acquisition screen 110 includes a message 111 indicating, for example, "Acquiring Settings. Please wait." Since the apparatus 20 acquires the settings from the HD 504, the time during which the setting acquisition screen 110 is displayed depends on an activation time of the HD 504. The setting acquisition screen 110 transitions to the no-Internet-connection screen 120, the apparatus information setting screen 130, or the main menu screen 190.

Figure 14:
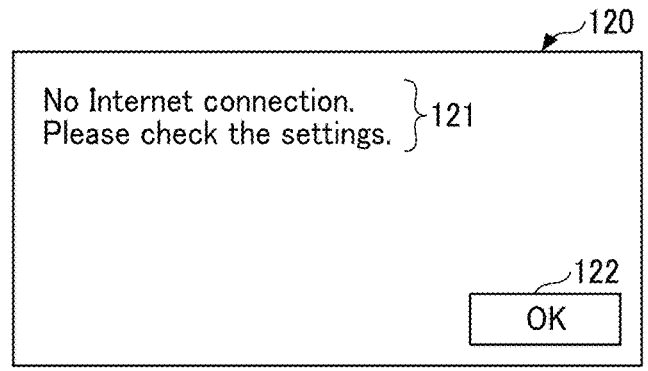
FIG. 14 is a diagram illustrating an example of no-Internet-connection screen according to the exemplary embodiment of the disclosure.

FIG. 14 is a diagram illustrating an example of the no-Internet-connection screen 120. The no-Internet-connection screen 120 is a screen displayed when the apparatus 20 fails to establish a communication with the information processing apparatus 40. The case where the apparatus 20 fails to communicate with the information processing apparatus 40 is, for example, a case where the apparatus 20 is not connected to the network N. The no-Internet-connection screen 120 includes a message 121 indicating, for example, "No Internet connection. Please check the settings." and an OK button 122. The repair request application 39 ends in response to the OK button 122 being pressed.

Figure 15:
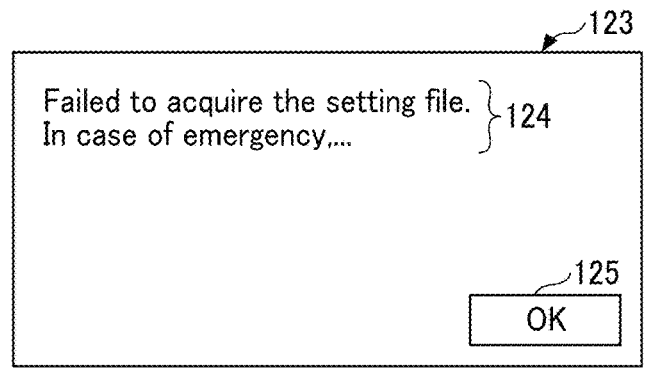
FIG. 15 is a diagram illustrating an example of a setting file acquisition failure screen according to the exemplary embodiment of the disclosure.

FIG. 15 is a diagram illustrating an example of a setting file acquisition failure screen 123. The setting file acquisition failure screen 123 transitions from the setting acquisition screen 110. The setting file acquisition failure screen 123 is a screen displayed when the apparatus 20 fails to obtain the settings from the HD 504. The setting file acquisition failure screen 123 includes a message 124 indicating, for example, "Failed to acquire the setting file. In an urgent case, . . . " and an OK button 125. The repair request application 39 ends in response to the OK button 125 being pressed.

Figure 16:
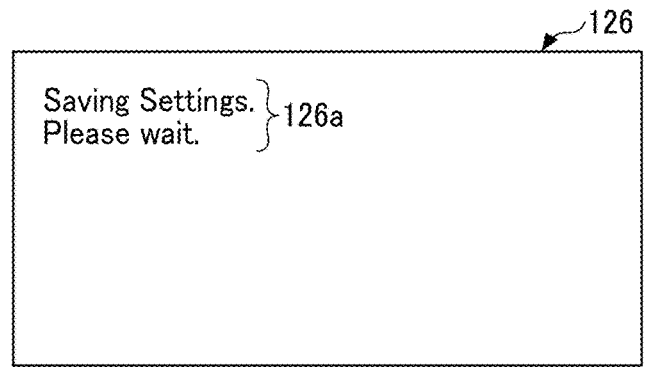
FIG. 16 is a diagram illustrating an example of a setting saving screen according to the exemplary embodiment of the disclosure.

FIG. 16 is a diagram illustrating an example of a setting saving screen 126. The setting saving screen 126 transitions from each of the various setting screens. The setting saving screen 126 is a screen displayed while the apparatus 20 is saving the settings in the HD 504. The setting saving screen 126 includes a message 126a indicating, for example, "Saving Settings. Please wait." The setting saving screen 126 is automatically disappear in response to completion of saving.

Figure 17:
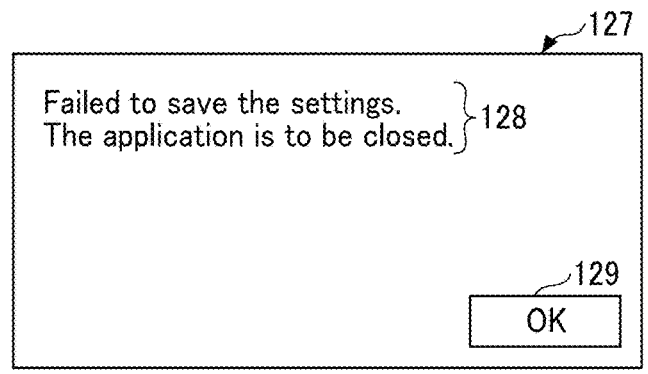
FIG. 17 is a diagram illustrating an example of a setting save failure screen according to the exemplary embodiment of the disclosure.

FIG. 17 is a diagram illustrating an example of a setting save failure screen 127. The setting save failure screen 127 transitions from each of the various setting screens. The setting save failure screen 127 is a screen displayed when the apparatus 20 fails to store the settings in the HD 504. The setting save failure screen 127 includes a message 128 indicating, for example, "Failed to save the settings. The application is to be closed." and an OK button 129. The repair request application 39 ends in response to the OK button 129 being pressed.

FIG. 18 is a diagram illustrating an example of the apparatus information setting screen 130. The apparatus information setting screen 130 is a screen via which the user is to perform an operation for the initial settings in relation to information on the apparatus 20 in the repair request application 39. The apparatus information setting screen 130 includes a model name field 131, a device number field 132, a region field 133, a forward button 134, and a back button 135. The information set with the apparatus information setting screen 130 is stored in the setting information storage unit 29a.

The model name field 131 is a field in which a product name, a model name, or a brand name is set, for example. An initial value acquired by the apparatus 20 from the HD 504 may be set.

The device number field 132 is a field in which a serial number is set, for example. An initial value acquired by the apparatus 20 from the HD 504 may be set.

The region field 133 is a field in which a region (for example, Japan, Asia, European Union (EU), and North America) where the apparatus 20 is installed is set.

The back button 135 at the upper left of the screen is a button for canceling the settings without executing setting with the apparatus information setting screen 130, and in this case, the repair request application 39 displays the application termination confirmation screen 109 of FIG. 12. The forward button 134 is a button for transitioning to the next setting screen.

FIG. 19 is a diagram illustrating an example of a region setting window 136. The region setting window 136 is displayed as a pop-up screen in response to the region field 133 of the apparatus information setting screen 130 being pressed. The region setting window 136 has a region name list 136a, a cancel button 136b, an OK button 136c. The user can scroll to view names of other regions displayed. In response to the cancel button 136b being pressed, the screen returns to the apparatus information setting screen 130, and in response to the OK button 136c being pressed after selecting a region name, the selected region name is displayed in the region field 133 in FIG. 18.

FIG. 20A is a diagram illustrating an example of a customer information setting screen (part 1) 140A. FIG. 20B is a diagram illustrating an example of a customer information setting screen (part 2) 140B. The customer information setting screen (part 1) 140A, the customer information setting screen (part 2) 140B are screens via which the user sets the customer information, and are continuously connected in the vertical direction. The information set with the customer information setting screen (part 1) 140A and the customer information setting screen (part 2) 140B is stored in the setting information storage unit 29a.

The customer information setting screen 140 includes a company name field 141, a name of person in charge field 142, a phone number field 143, an e-mail address field 144, and a department name field 145.

The company name field 141 is a field in which a company name of the customer is input.

The name of person in charge field 142 is a field in which information on a person in charge of the company in which the apparatus 20 is installed is input.

The phone number field 143 is a field in which a telephone number of the person in charge is input.

The e-mail address field 144 is a field in which a mail address of a person in charge is input.

The department name field 145 is a field in which a name of a department of the person in charge is input.

The maximum number of persons to be settable to the name of person in charge field 142, the phone number field 143, the e-mail address field 144, and the department name field 145 is three.

FIG. 21 is a diagram illustrating an example of an e-mail CC setting screen (part 1) 150A. The e-mail CC setting screen (part 1) 150A is a setting screen of an e-mail address to which an e-mail is transmitted by carbon copy. The e-mail CC setting screen (part 1) 150A is displayed at a time of initial activation. The e-mail CC setting screen (part 1) 150A includes a message 151 indicating, for example, "Set an e-mail address for CC to send a copy of e-mail, and press "Next" button. *Note that if the person in charge wants to receive a copy of e-mail, please set the e-mail address of the person in charge to CC.," a sender e-mail address field 152, and a plurality of CC address fields 153.

Note that an e-mail address of a sender filled in the sender e-mail address field 152 is fixed to an e-mail address of the repair request application 39 (the setting field is grayed out and not changeable).

Figure 22:
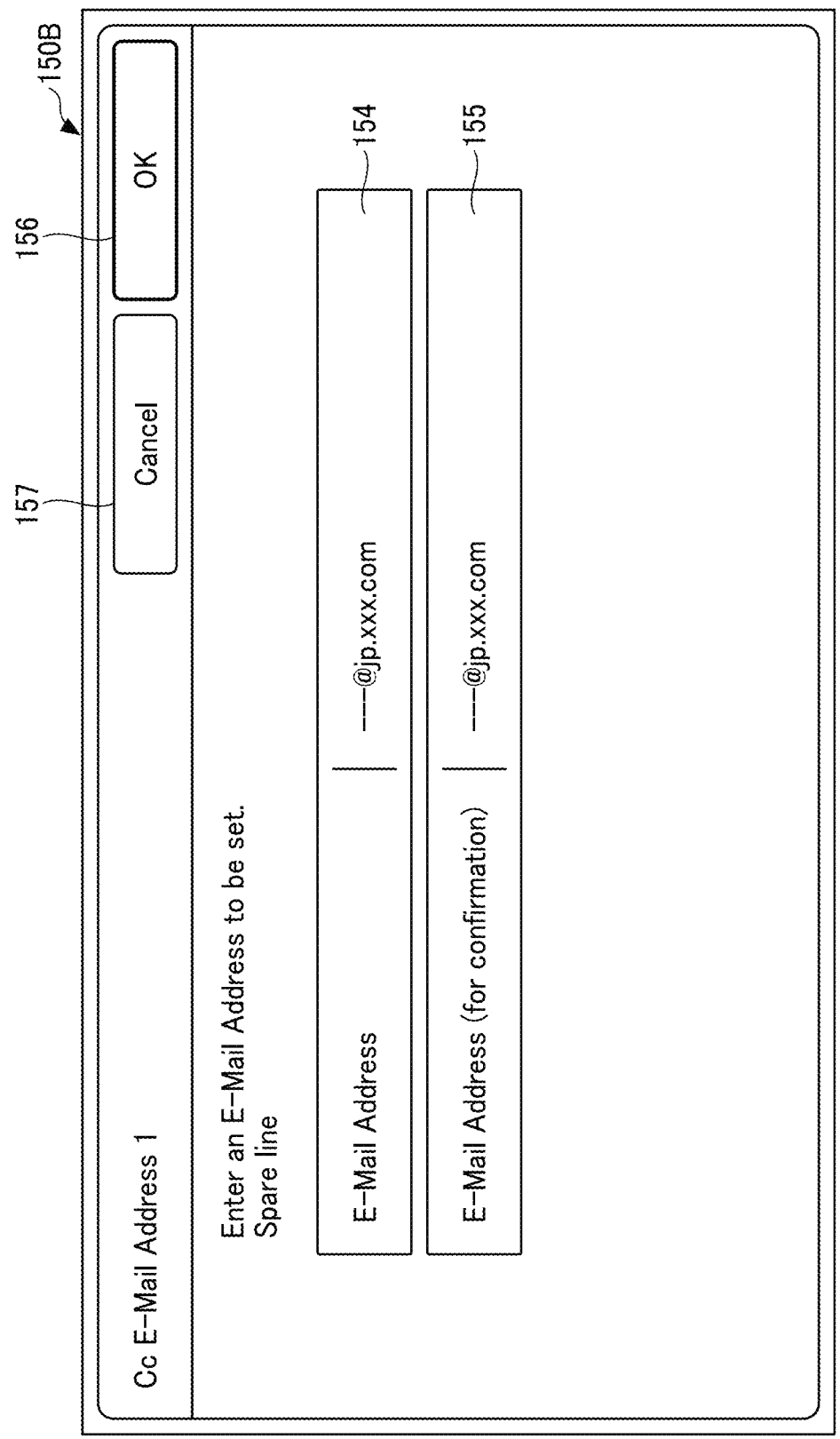
FIG. 22 is a diagram illustrating an example of an e-mail CC setting screen (part 2) according to the exemplary embodiment of the disclosure.

In response to the CC address field 153 being pressed, an e-mail CC setting screen (part 2) 150B illustrated in FIG. 22 is displayed. The e-mail CC setting screen (part 2) 150B has an e-mail address field 154 and an e-mail address field (for confirmation) 155. When there is a difference between an input values in the e-mail address field 154 and the e-mail address field (for confirmation) 155, even if the user presses the OK button 156, an error is displayed, and the screen transition is not to be performed. In response to the cancel button 157 being pressed, the value returns to the initial value, and the e-mail CC setting screen (part 2) 150B closes.

Figure 23:
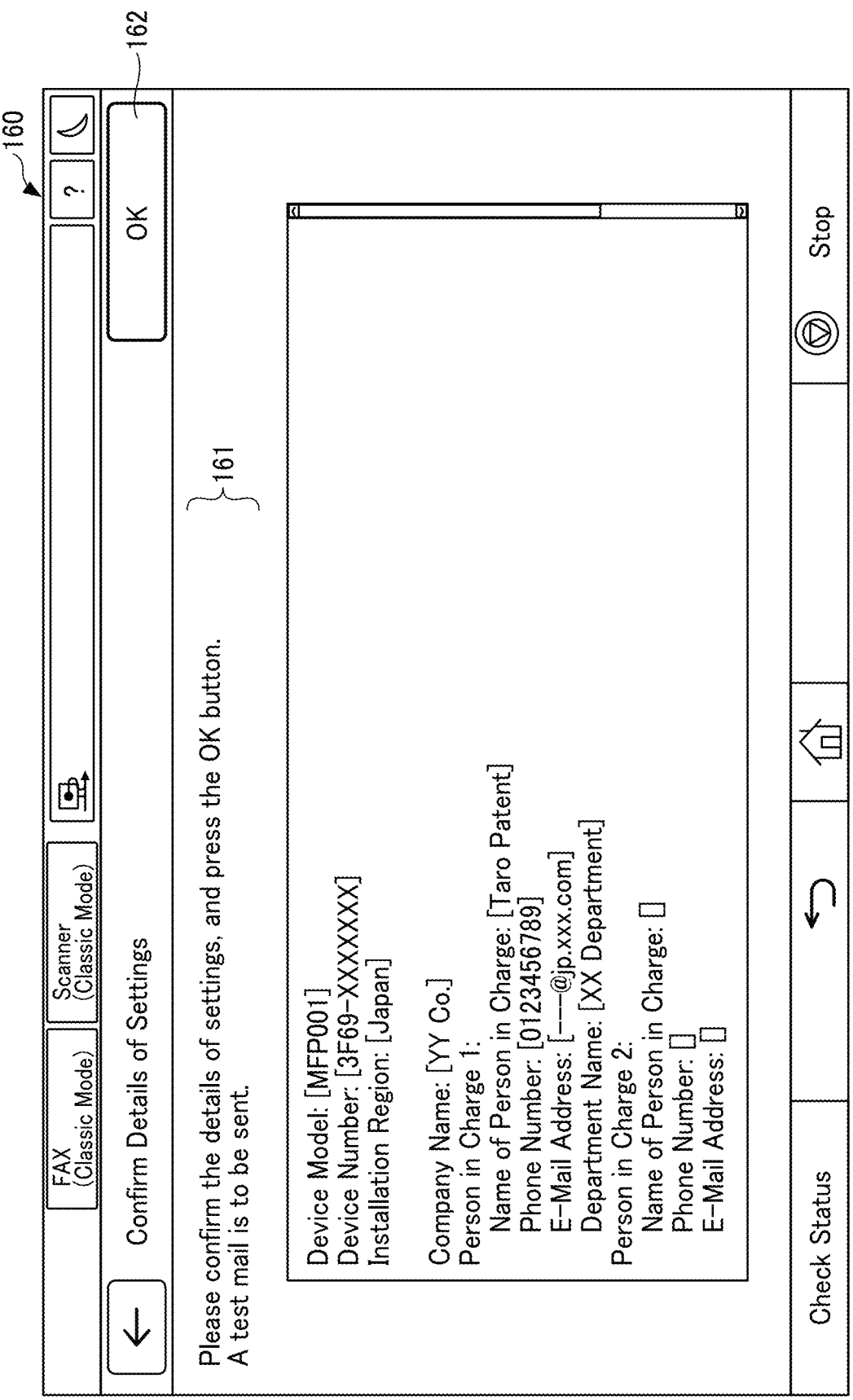
FIG. 23 is a diagram illustrating an example of a setting confirmation screen according to the exemplary embodiment of the disclosure.

FIG. 23 is a diagram illustrating an example of the setting confirmation screen 160. The setting confirmation screen 160 displays details of settings for the apparatus information and the customer information. The setting confirmation screen 160 is a screen on which the information can be scrolled up and down. The setting confirmation screen 160 includes a message 161 indicating, for example, "Please confirm the details of settings, and press the OK button. When you press the OK button, a test mail is to be sent." and an OK button 162. All the settings configured in the initial setting are displayed on the setting confirmation screen 160. In response to the OK button 162 being pressed, the apparatus 20 automatically transmits a test mail.

Figure 24:
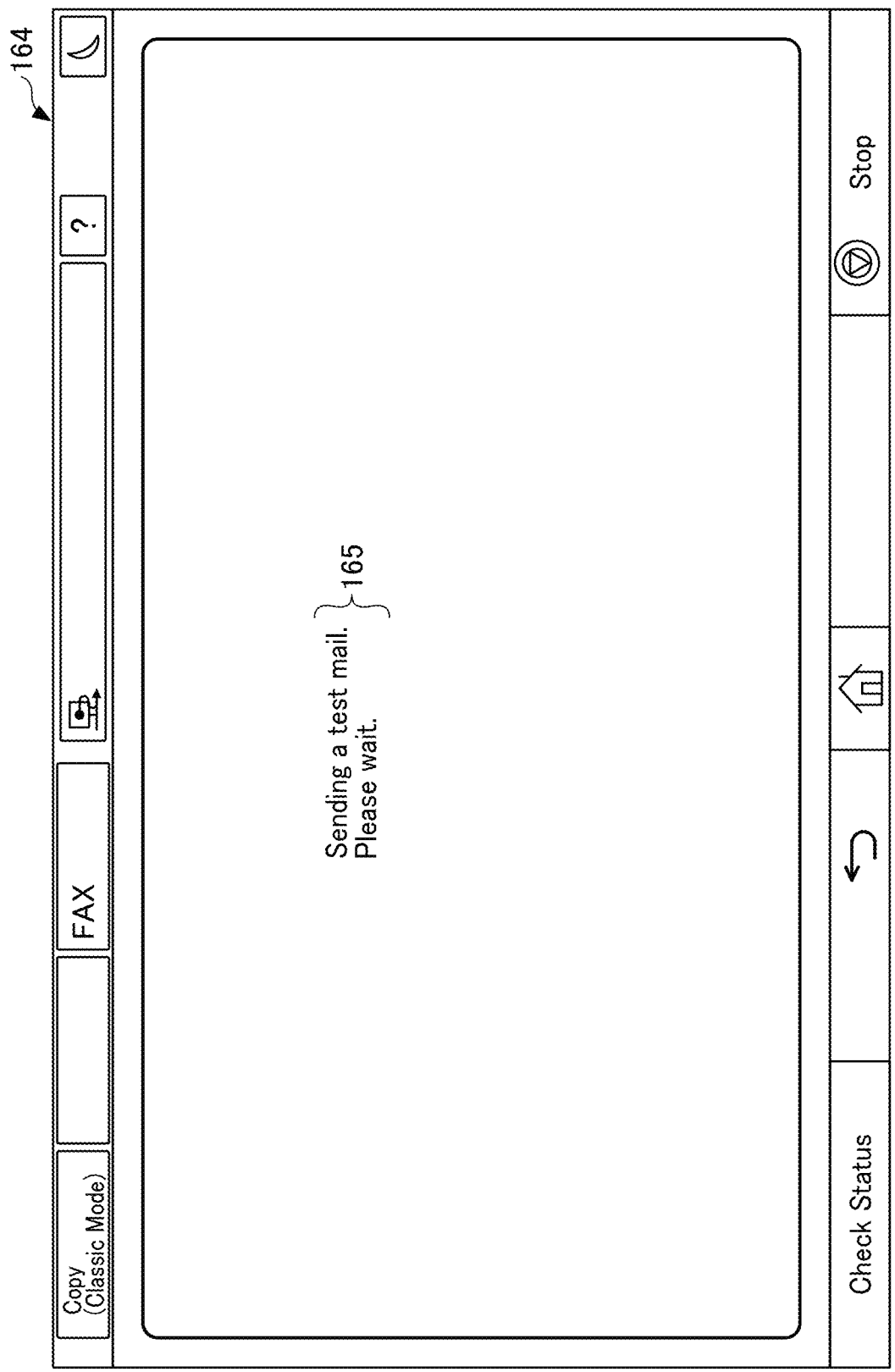
FIG. 24 is a diagram illustrating an example of a test mail transmission screen according to the exemplary embodiment of the disclosure.

FIG. 24 is a diagram illustrating an example of a test mail transmission screen 164. The test mail transmission screen 164 is displayed during the transmission of the test mail. The test mail transmission screen 164 includes a message 165 indicating, for example, "Sending a test mail. Please wait." When the transmission of the test mail is successful, the test mail transmission screen 164 transitions to a test mail transmission test result screen (succeeded) 170. When the transmission of the test mail fails, the test mail transmission screen 164 transitions to a test mail transmission test result screen (failed) 180.

Figure 25:
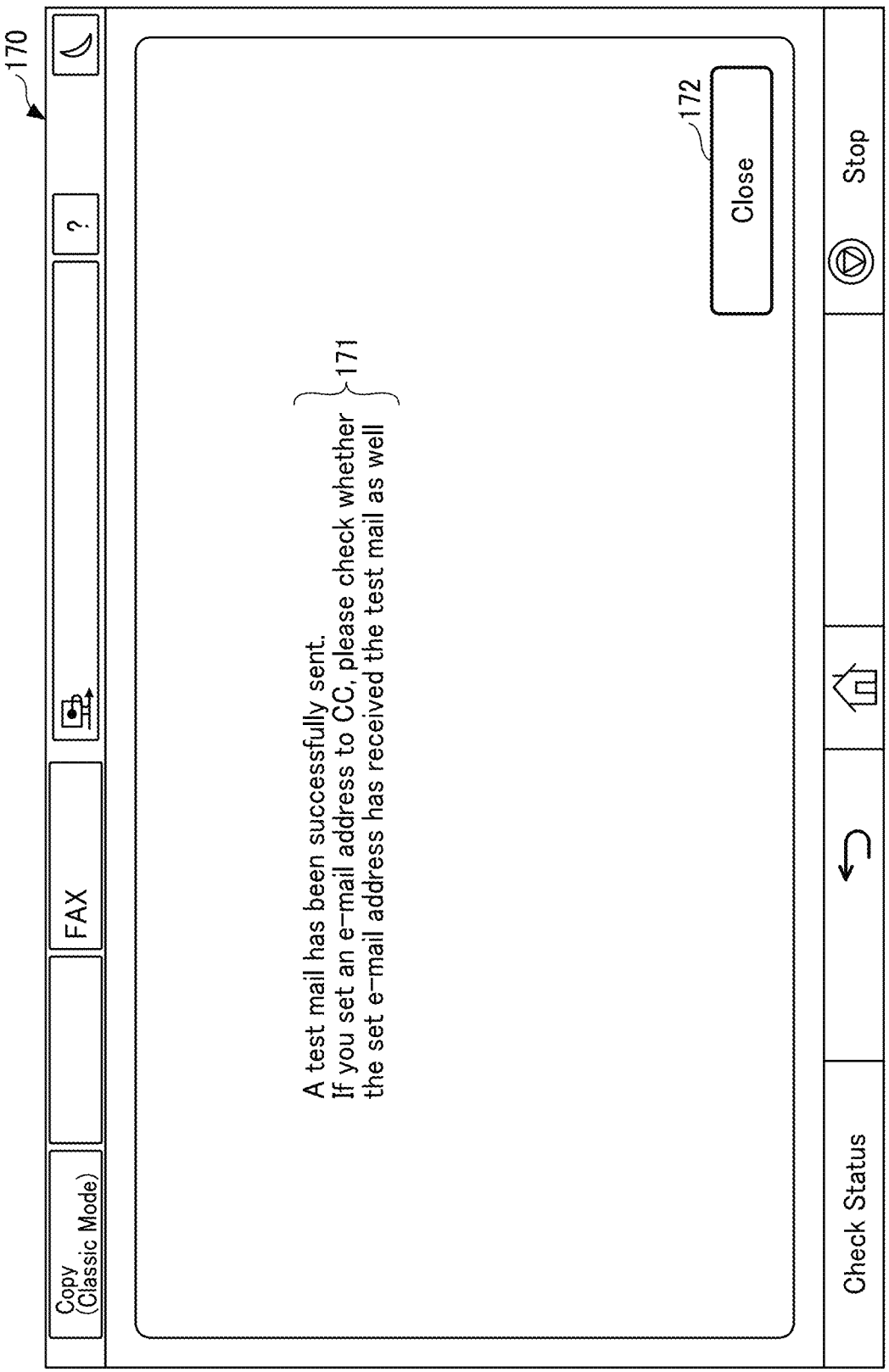
FIG. 25 is a diagram illustrating an example of a test mail transmission test result screen (succeeded) according to the exemplary embodiment of the disclosure.

FIG. 25 is a diagram illustrating an example of the test mail transmission test result screen (succeeded) 170. The test mail transmission test result screen (succeeded) 170 is displayed when the transmission of the test mail is successful. The test mail transmission test result screen (succeeded) 170 includes a message 171 indicating, for example, "A test mail has been successfully sent. If you set an e-mail address to CC, please check whether the set e-mail address has received the test mail as well." and a close button 172. The test mail transmission test result screen (succeeded) 170 transitions to the main menu screen 190 in response to the close button 172 being pressed.

Figure 26:
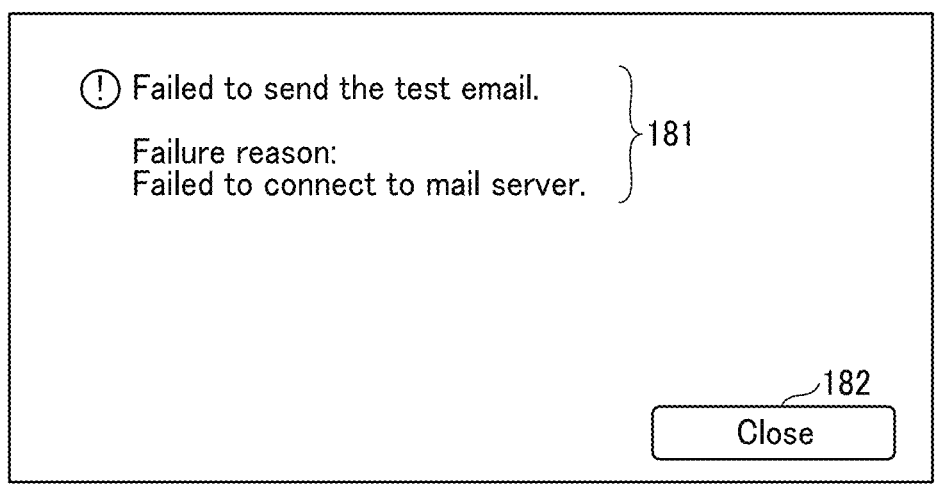
FIG. 26 is a diagram illustrating an example of a test mail transmission test result screen (failed) according to the exemplary embodiment of the disclosure.

FIG. 26 is a diagram illustrating an example of the test mail transmission test result screen (failed) 180. The test mail transmission test result screen (failed) 180 is displayed when the transmission of the test mail has been failed. The test mail transmission test result screen (failed) 180 includes a message 181 indicating, for example, "Failed to send the test mail. Failure reason: (detected failure reason)." and a close button 182. The test mail transmission test result screen (failed) 180 transitions to the main menu screen 190 in response to the close button 182 being pressed.

Figure 27:
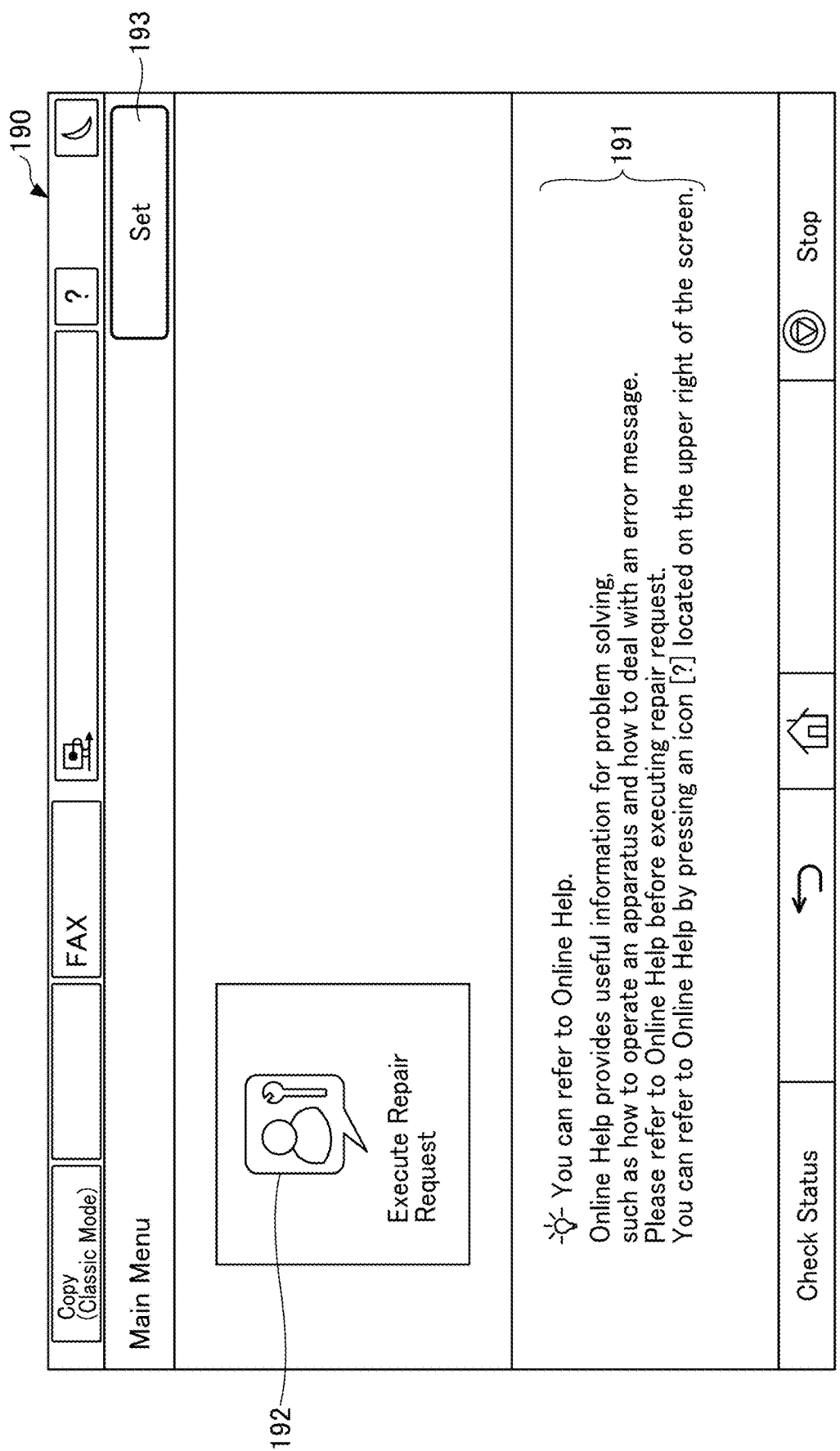
FIG. 27 is a diagram illustrating an example of a main menu screen according to the exemplary embodiment of the disclosure.

Screen for Requesting Repair Using Repair Request Application:

FIG. 27 is a diagram illustrating an example of the main menu screen 190. The main menu screen 190 is a home screen of the repair request application 39. The main menu screen 190 includes a message 191 indicating, for example, "Web Help provides useful information on how to deal with an error message. Please refer to Web Help before requesting for the service. You can refer Web Help by pressing an icon [?] located on the upper right of the screen," a repair request execution button 192, and a set button 193. In response to the set button 193 being pressed, the main menu screen 190 transitions to the setting screen 330.

Figure 28:
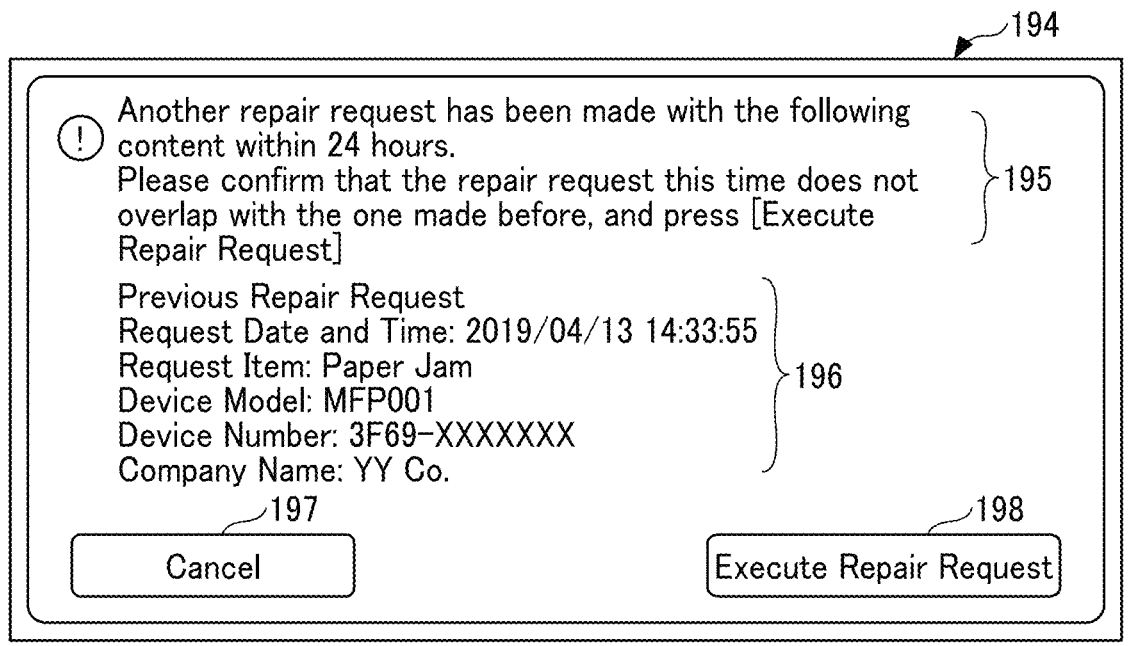
FIG. 28 is a diagram illustrating an example of a request overlap check screen according to the exemplary embodiment of the disclosure.

In addition, in response to the repair request execution button 192 being pressed, the main menu screen 190 transitions to the repair request screen 200, but in a case where the apparatus 20 transmits a repair request mail, for example, within 24 hours (within a certain period of time) from transmission of a previous repair request, the screen transitions to a request overlap check screen 194 illustrated in FIG. 28. The certain period of time may be set by a designer or a user. The transmission date and time of the previous repair request may be a "request date and time" described in a repair request mail, or may be a time at which a send button 230a in FIG. 39 is pressed.

FIG. 28 is a diagram illustrating an example of the request overlap check screen 194. The request overlap check screen 194 is a screen for checking overlapping of repair requests. The request overlap check screen 194 includes a message 195 indicating, for example, "Another repair request has been made with the following content within 24 hours. Please confirm that the repair request this time does not overlap with the one made before, and press [Execute Repair Request]," details of last repair request mail 196, a cancel button 197, and a repair request button 198. The request overlap check screen 194 transitions to the main menu screen 190 in response to the cancel button 197 being pressed. In response to the repair request button 198 being pressed, the request overlap check screen 194 transitions to the repair request screen 200.

Figures 29A, 29B:
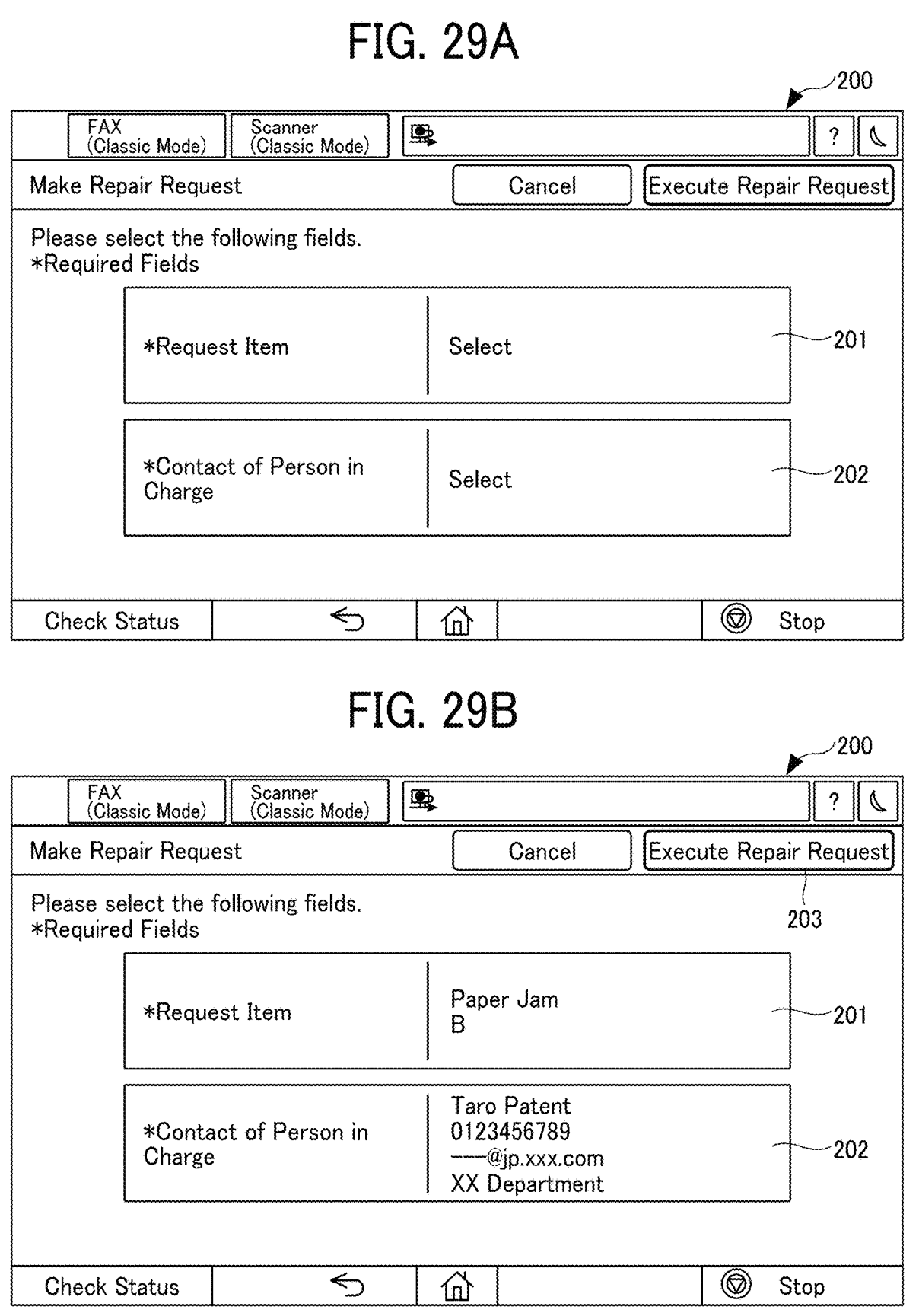

FIGS. 29A to 29C are diagrams illustrating examples of the repair request screen 200. The repair request screen 200 is a screen via which the user inputs the repair request. The repair request screens 200 of FIGS. 29A to 29C illustrates states of the same screen, in relation to before and after setting. The details of flow of the screen is described later.

The repair request screen 200 includes a request item field 201, a person-in-charge name field 202, and a remark field 252.

With the request item field 201, a request item (for example, category, subcategory) for repair is set. In response to the request item field 201 being pressed, the request item setting screen 250 is displayed. The request item includes what kind of abnormality has occurred.

With the person-in-charge name field 202, information on a person in charge, namely a contact destination for repair is set.

FIG. 29B illustrates the repair request screen 200 in which each field is set. In response to a request execution button 203 at the upper right being pressed, the repair request mail confirmation screen 230 is displayed. In a case of presence of a self-solving method (FAQ information) for an item selected by the user, the self-solving method display permission screen 210 is to be displayed.

FIG. 29C illustrates the repair request screen 200 after the execution of the repair request. Repair request content 204 (for one case) corresponding to the previous repair request is displayed in the upper part of the screen. In response to a detail button 205 being pressed, the repair request history screen 240 is displayed. If a repair request has not been made before, the repair request history screen 240 is not to be displayed.

FIG. 30 is a diagram illustrating an example of the request item setting screen 250. The request item setting screen 250 is a screen via which the user inputs a request item.

With a field 251 for setting a repair item, a repair request item is set. In response to the field 251 for setting a repair item being pressed, the repair request screen 200 transitions to a request item selection screen (part 1) 253A.

In the remark field 252, a detailed explanation about the repair request is input.

Figure 31A:
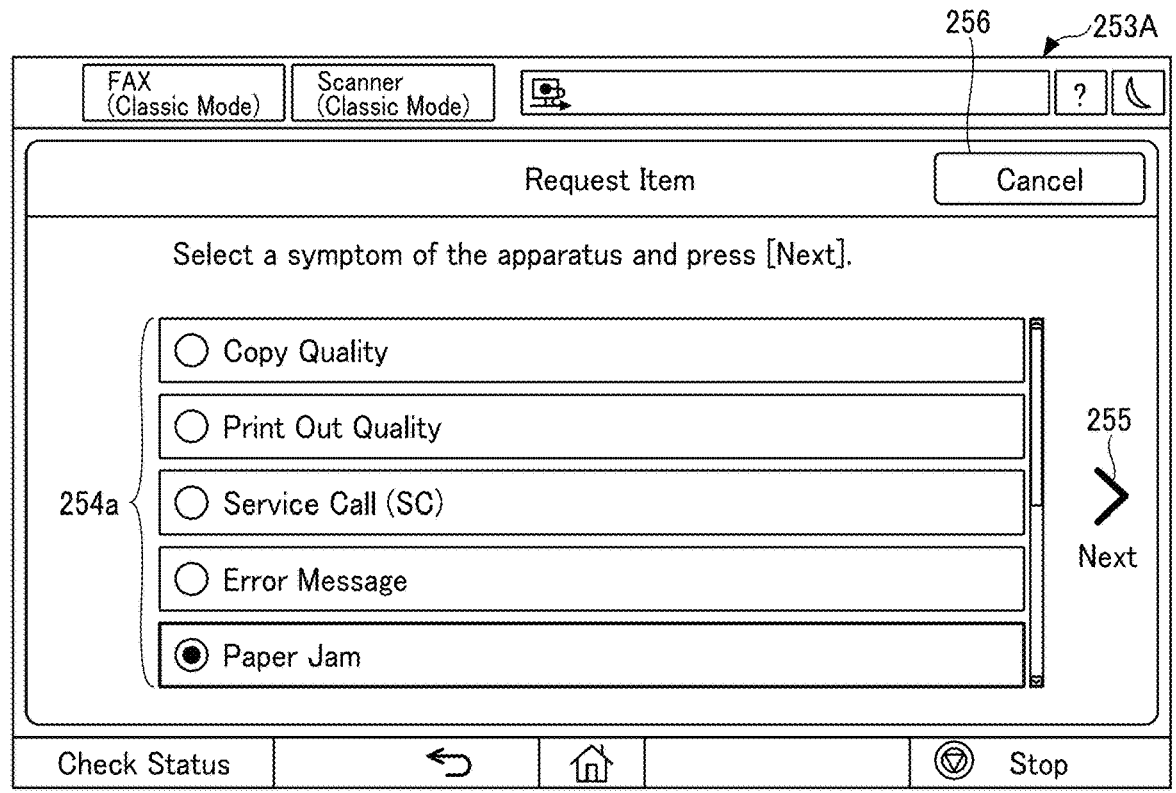
FIGS. 31A and 31B are diagrams illustrating examples of a request item selection screen (part 1) and a request item selection screen (part 2), respectively, according to the exemplary embodiment of the disclosure.
Figure 31B:
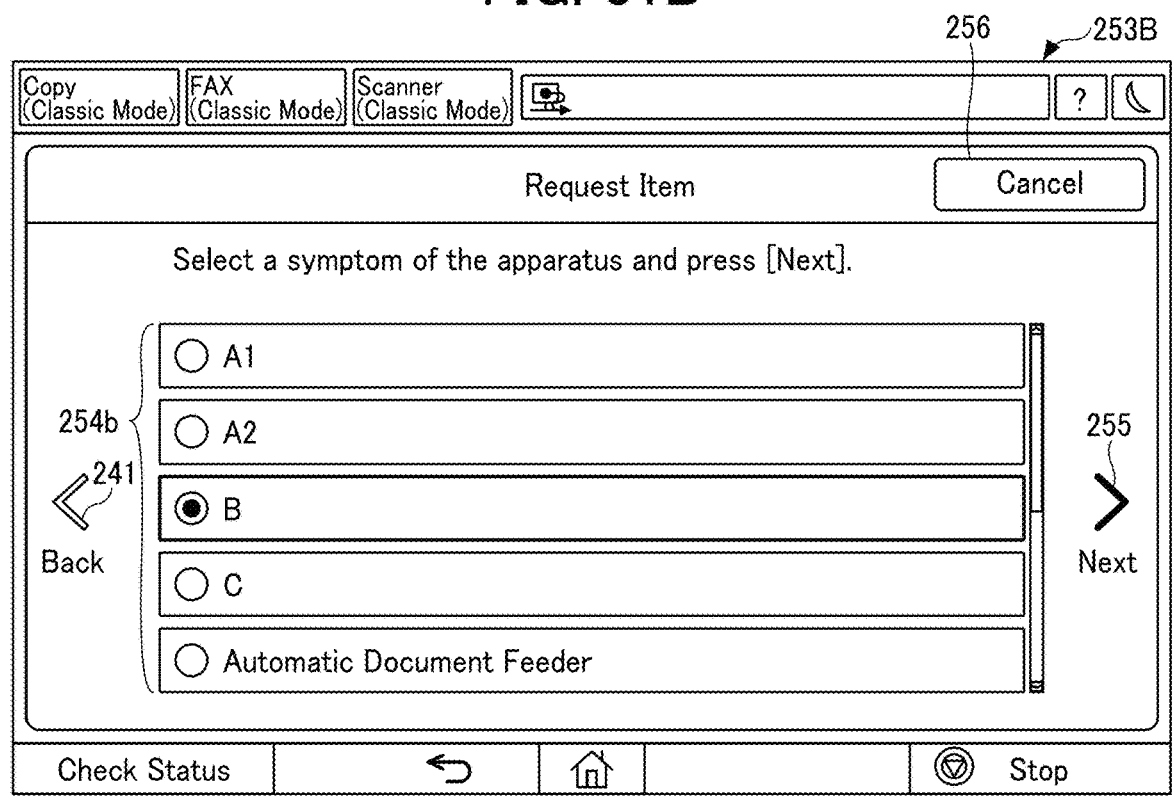

FIG. 31A is a diagram illustrating an example of the request item selection screen (part 1) 253A. FIG. 31B is a diagram illustrating an example of a request item selection screen (part 2) 253B. The request item selection screen (part 1) 253A displays a category list 254a, and the request item selection screen (part 2) 253B displays a subcategory list 254b. The request item selection screen (part 1) 253A and the request item selection screen (part 2) 253B have a hierarchical structure, and the request item selection screen 253B displays subcategories in a lower layer of a category selected in the request item selection screen (part 1) 253A.

In an initial value, the request item selection screen (part 1) 253A or the request item selection screen (part 2) 253B has an initial value with which an item in the first row of the list is in a selected manner. In response to a next button 255 being pressed, the screen transitions to a next screen if there is a next layer, and if there is no next layer, the request item selection screen (part 2) 253B transitions to a post-request-item-selection screen 257. In response to a back button 241 being pressed, the request item selection screen (part 2) 253B transitions to a previous hierarchical screen. The selected request item returns to the initial value by pressing a cancel button 256, and each of the request item selection screen (part 1) 253A and the request item selection screen (part 2) 253B closes.

The items displayed on the request item selection screen (part 1) 253A and the request item selection screen (part 2) 253B are determined based on the information acquired from the information processing apparatus 40. The options are switched for each region (a region is set by, for example, a user). The request item may be input by voice of the user. The user may input the details of the problem in natural language. The user may speak the details of the problem freely, or may answer a question from the device by voice.

FIG. 32 is a diagram illustrating an example of the post-request-item-selection screen 257. The post-request-item-selection screen 257 is a screen for confirming the request item selected by the user. A displayed item displayed in a request item field 257a of the post-request-item-selection screen 257 varies depending on the request item set by the user via the request item selection screen (part 1) 253A and the request item selection screen (part 2) 253B. Text set in the remarks field 252 of the request item setting screen 250 is displayed in a remarks field 257b. In response to an OK button 257c being pressed, the post-request-item-selection screen 257 transitions to the self-solving method display permission screen 210.

The items displayed on the post-request-item-selection screen 257 are determined based on the information acquired from the information processing apparatus 40. The options are switched for each region.

Figure 33:
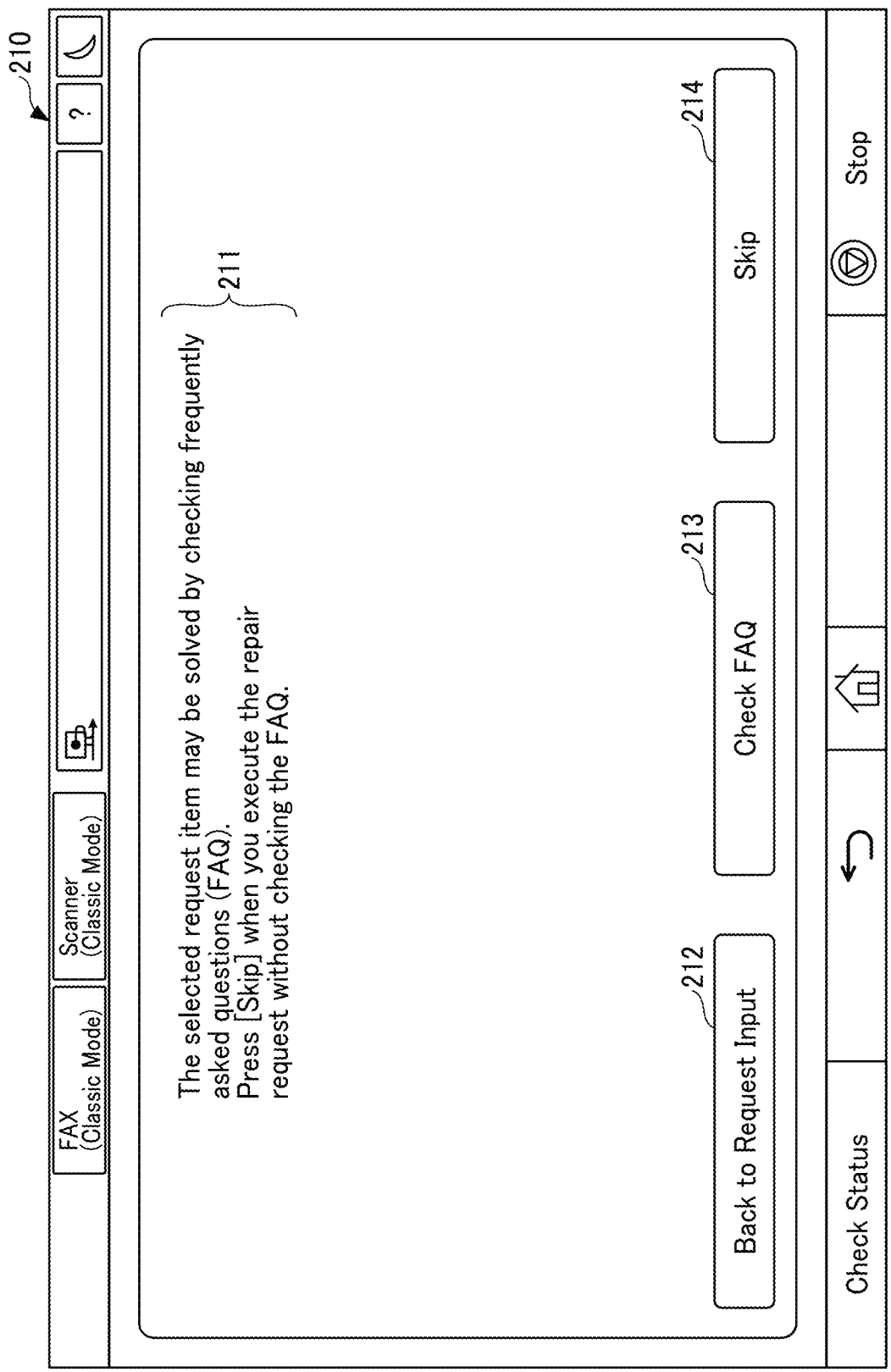
FIG. 33 is a diagram illustrating an example of a self-solving method display permission screen according to the exemplary embodiment of the disclosure.

FIG. 33 is a diagram illustrating an example of the self-solving method display permission screen 210. The self-solving method display permission screen 210 is a screen for prompting the user to solve the problem. The self-solving method display permission screen 210 includes a message 211 indicating, for example, "The selected request item may be solved by checking frequently asked questions [FAQ]. Press [Skip] when you execute the repair request without checking the FAQ," a back-to-request input button 212 for returning to request input, a FAQ check button 213 for checking FAQ, and a skip button 214.

In response to the skip button 214 being pressed, the self-solving method display permission screen 210 transitions to the repair request mail confirmation screen 230. In this case, the apparatus 20 can execute the repair request without displaying the FAQ, and the repair request includes information that indicates output of the troubleshooting information has been unexecuted and corresponds to the information indicating whether the troubleshooting information has been output or not. In response to the FAQ check button 213 being pressed, the self-solving method display permission screen 210 transitions to the FAQ display screen 220. In response to the back-to-request input button 212 being pressed, the self-solving method display permission screen 210 returns to the repair request screen 200.

Figure 34:
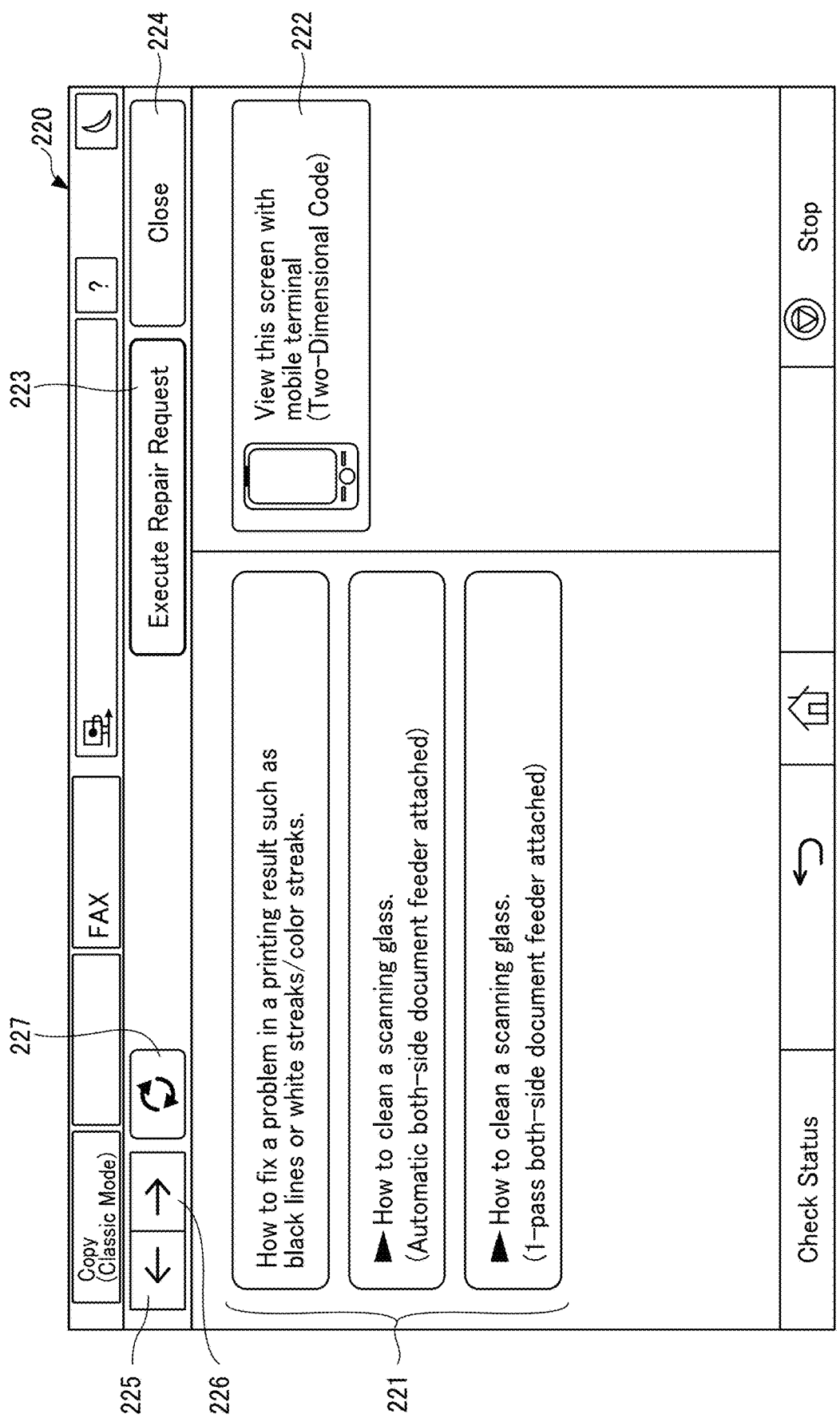
FIG. 34 is a diagram illustrating an example of an FAQ display screen according to the exemplary embodiment of the disclosure.

FIG. 34 is a diagram illustrating an example of the FAQ display screen 220. The FAQ display screen 220 displays an FAQ list 221 and a two-dimensional code display button 222. The FAQ list 221 corresponds to the inquiry list. The FAQ display screen 220 further includes a repair request execution button 223, a close button 224, a back button 225, a forward button 226, and an update button 227. In response to the repair request execution button 223 being pressed, the apparatus 20 displays a repair request mail confirmation screen 230.

In response to the close button 224 being pressed, the FAQ display screen 220 transitions to the repair request screen 200. When the FAQ extends over a plurality of pages, a previous page of the FAQ display screen 220 is displayed by pressing the back button 225. A next page of the FAQ display screen 220 is displayed by pressing the forward button 226. The FAQ display screen 220 is updated by pressing the update button 227. While a browser screen is being read, a progress bar is displayed at the center of the screen. When a FAQ is selected from the FAQ list 221, the FAQ display screen 220 transitions to a troubleshooting screen 228A.

The two-dimensional code display button 222 is a button for displaying a two-dimensional code. The two-dimensional code includes a URL for displaying the FAQ display screen 220 of FIG. 34 on the portable terminal 30. Accordingly, the portable terminal 30 can display the FAQ screen by capturing the two-dimensional code with a camera of the portable terminal 30.

Figure 35A:
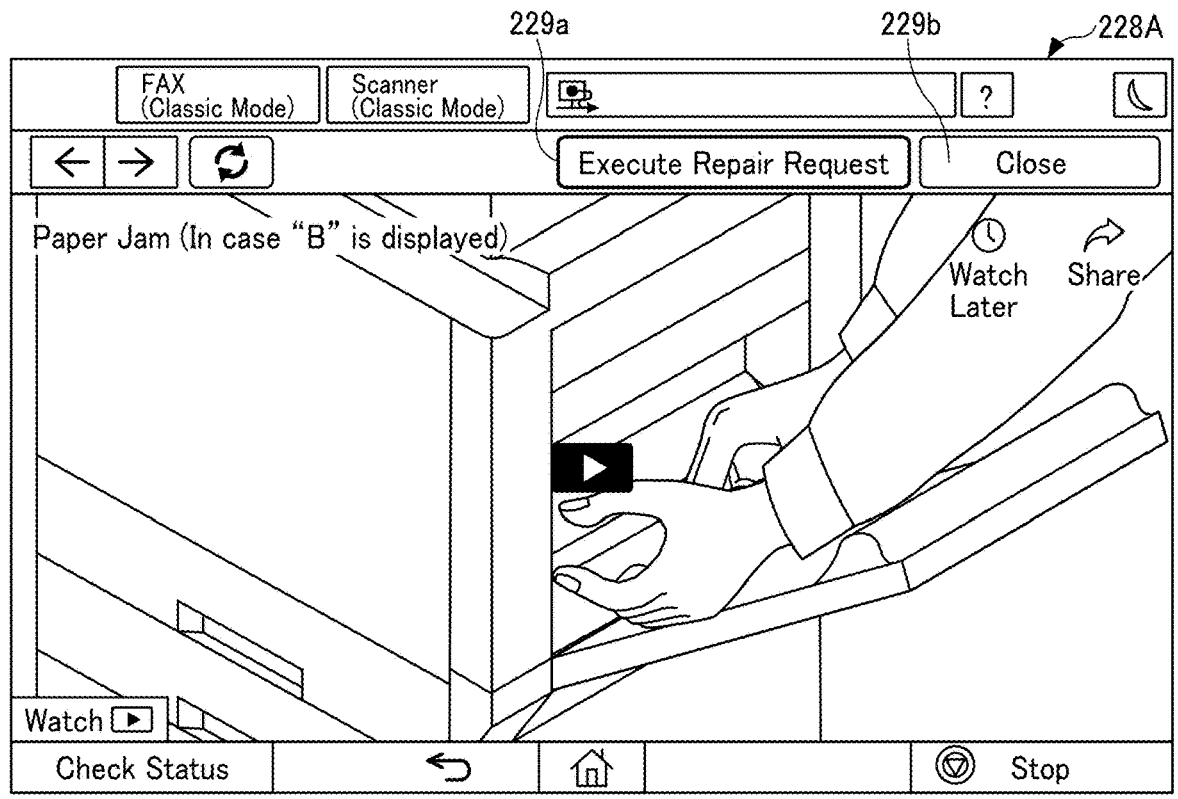
FIGS. 35A and 35B are diagrams illustrating examples of a troubleshooting screen according to the exemplary embodiment of the disclosure.
Figure 35B:
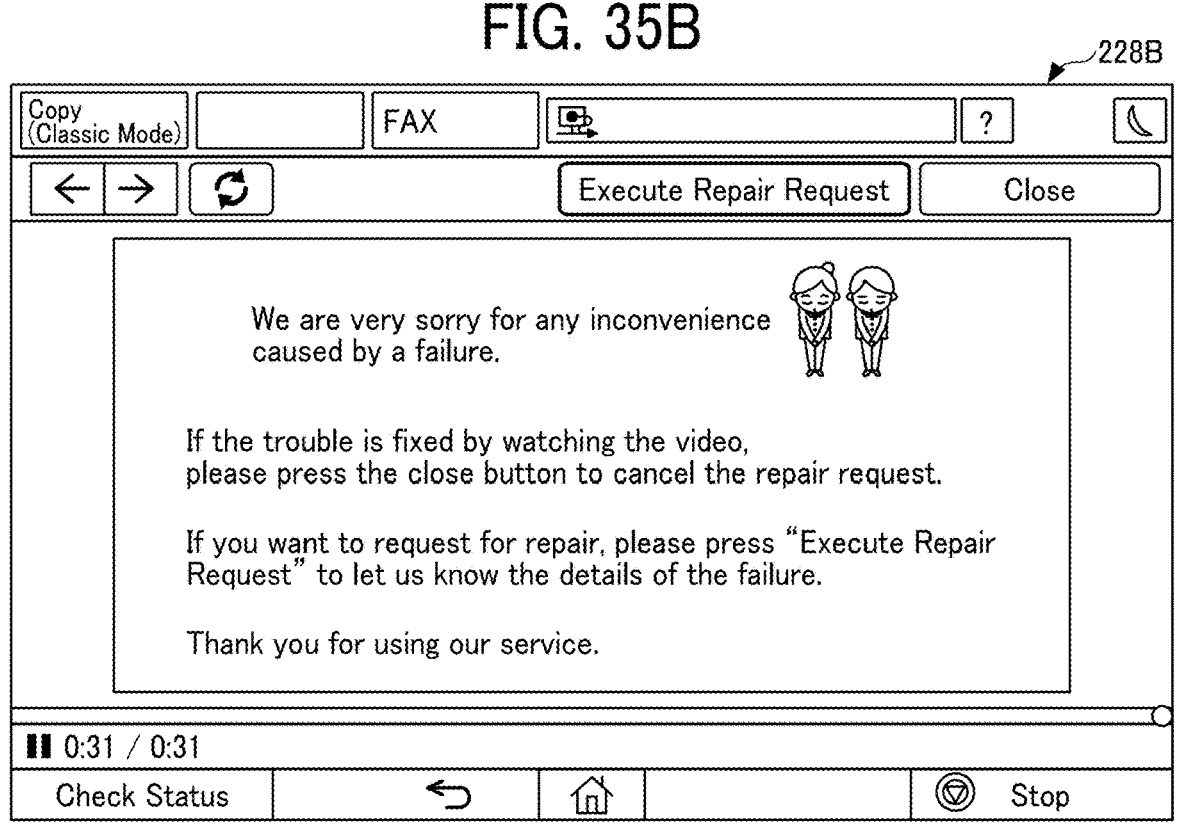

FIGS. 35A and 35B are diagrams illustrating examples of the troubleshooting screens 228A and 228B, respectively. The troubleshooting screens 228A and 228B in FIGS. 35A and 35B are related to a case in which the troubleshooting information is provided by a moving image. The troubleshooting screens 228A and 228B display moving images, and have a repair request execution button 229a and a close button 229b. In response to the repair request execution button 229a being pressed, each of the troubleshooting screens 228A and 228B transitions to the repair request screen 200 illustrated in FIG. 29B. In response to the close button 229b being pressed, each of the troubleshooting screens 228A and 228B returns to the FAQ display screen 220.

FIG. 36 is a diagram illustrating an example of an abnormality display selection screen 340. The abnormality display selection screen 340 transitions when a service call is selected in the request item selection screen 253A of FIG. 31A. The abnormality display selection screen 340 is a screen via which the user inputs a system error code when the system error code is displayed. The abnormality display selection screen has a system error code input field 341 and a remarks field 342. In addition, the system error code is related to a hardware error so that there is not so much thing that the user can do. Accordingly, the user selects a service call as a category to display the abnormality display selection screen 340, and inputs the system error code. In this case, the request item (category and subcategory) may or may not be set. In the information processing apparatus 40, an FAQ and a URL are associated with the system error code.

FIG. 37 is a diagram illustrating an example of the contact setting screen 260. The contact setting screen 260 transitions in response to the person in charge name field 202 being pressed on the repair request screen 200A illustrated in FIG. 29A. The contact setting screen 260 is a screen via which the user sets a contact destination regarding the request item. The contact setting screen 260 includes a registered-person-in-charge field 261 and a non-registered person-in-charge field 262. The registered-person-in-charge field 261 or the non-registered person-in-charge field 262 is selected by the user. When the non-registered person-in-charge field 262 is selected, a person in charge name field, a phone number field, an e-mail address field, and a department name field can be set.

Figure 38:
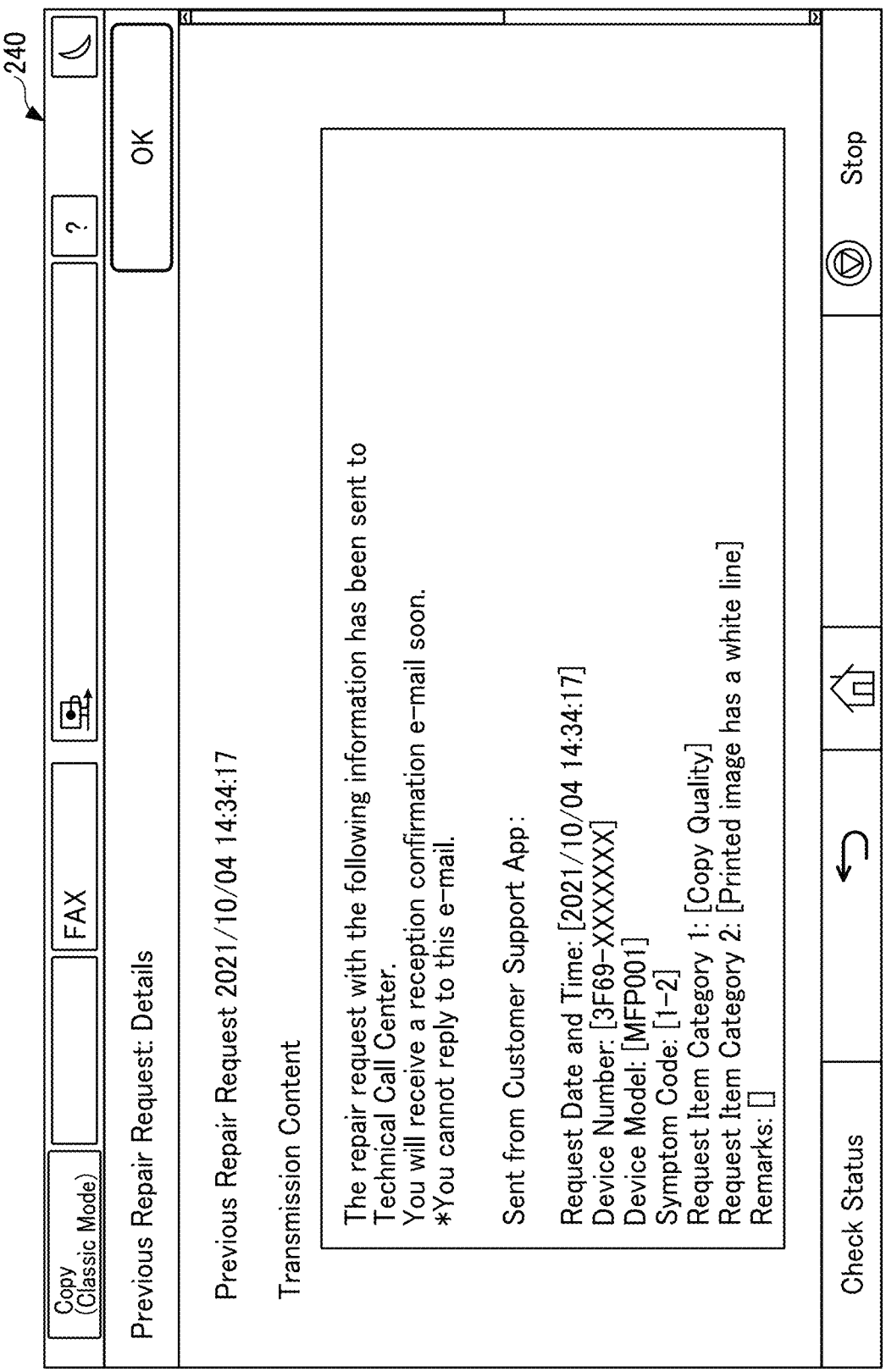
FIG. 38 is a diagram illustrating an example of a repair request history screen according to the exemplary embodiment of the disclosure.

FIG. 38 is a diagram illustrating an example of the repair request history screen 240. The repair request history screen 240 is displayed in response to the detail button 205 in FIG. 29C being pressed. The repair request history screen 240 displays details of the previous repair request that is corresponding to one request. As the details, since the text of e-mail is displayed as it is, the details do not depend on a language of the operation unit.

FIG. 39 is a diagram illustrating an example of the repair request mail confirmation screen 230. The repair request mail confirmation screen 230 is displayed in response to the repair request execution button 229a in FIGS. 35A and 35B being pressed. The repair request mail confirmation screen 230 is a screen for confirming details of a repair request mail. The repair request mail confirmation screen 230 displays a message 231 indicating, for example, "The details of the repair request mail is confirmed as follows. If there is no problem, please press the "request execution" button." and details 232 of the transmission mail. As the details, since the text of e-mail is displayed as it is, the repair request mail confirmation screen 230 does not depend on a language of the operation unit. In response to the send button 230a being pressed, the repair request mail confirmation screen 230 transitions to a repair request mail transmission screen 233.

FIG. 40 is a diagram illustrating an example of the repair request mail transmission screen 233. The repair request mail transmission screen 233 is a screen displayed during transmission of the repair request mail. The repair request mail transmission screen 233 displays a message 233a indicating, for example, "Sending Repair Request. Please Wait." Upon completion of the transmission, the repair request mail transmission screen 233 transitions to the repair request mail transmission result screen (succeeded) 280 or the repair request mail transmission result screen (failed) 270.

Figure 41A:
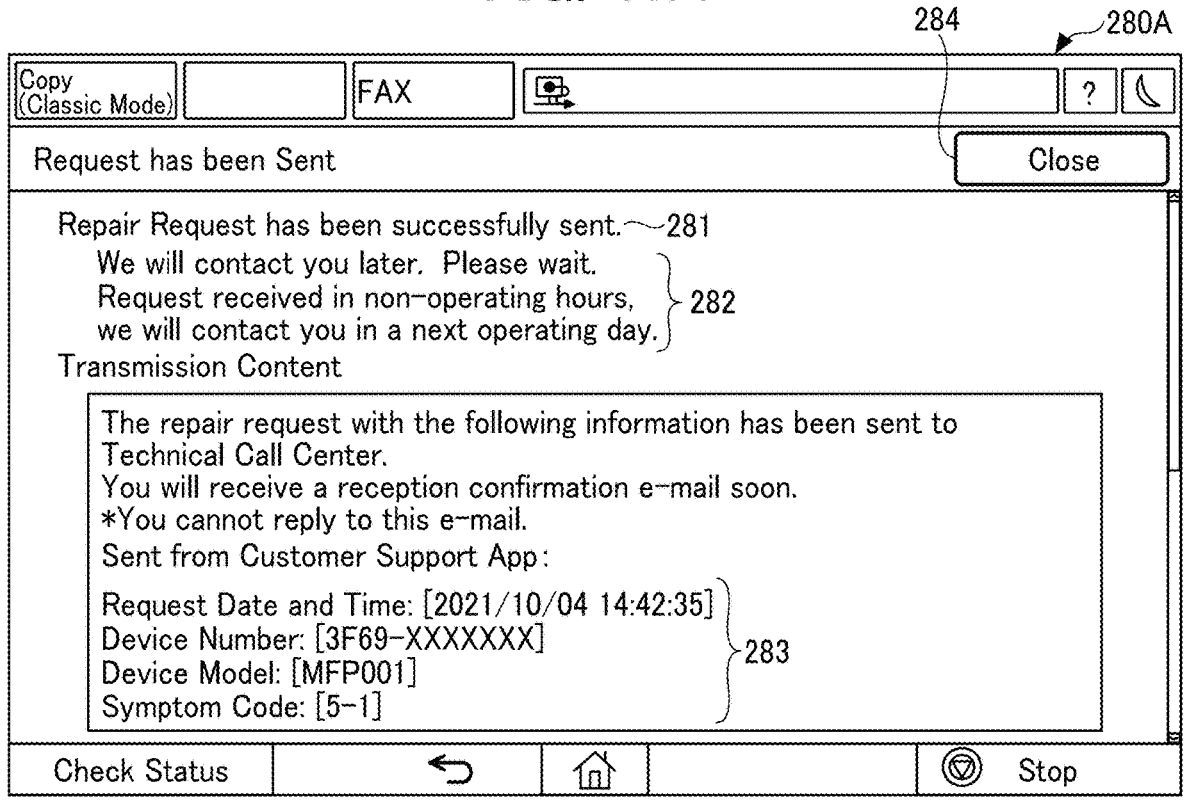
FIGS. 41A and 41B are diagrams illustrating examples of repair request mail transmission result screens (succeeded) according to the exemplary embodiment of the disclosure.
Figure 41B:
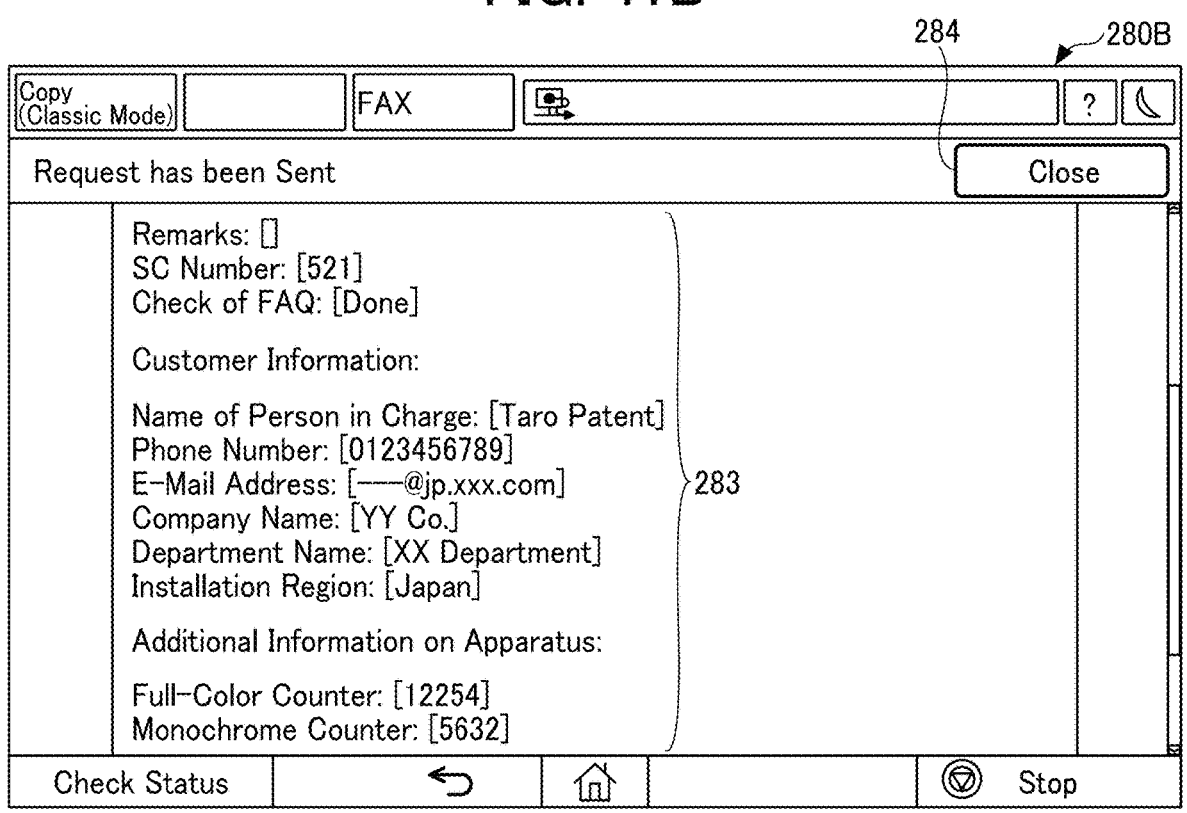

FIGS. 41A and 41B are diagrams illustrating examples of repair request mail transmission result screens (succeeded) 280A and 280B, respectively. The repair request mail transmission result screens (succeeded) 280A and 280B are screens of which the information can be scrolled up and down. The repair request mail transmission result screens (succeeded) 280A and 280B are screens displayed when the transmission of the repair request mail is successful. The repair request mail transmission result screens (succeeded) 280A and 280B includes a message 281 indicating, for example, "Repair Request has been successfully sent," information 282 transmitted from the information processing apparatus 40, and transmitted mail information 283. The transmitted mail information 283 corresponds to the details of the transmitted mail (see FIG. 50). Since the text of e-mail is displayed as it is, the details do not depend on a language of the operation unit. The repair request mail transmission result screens (succeeded) 280A and 280B return to the main menu screen 190 in response to a close button 284 at the upper right of the screen being pressed.

Figure 42:
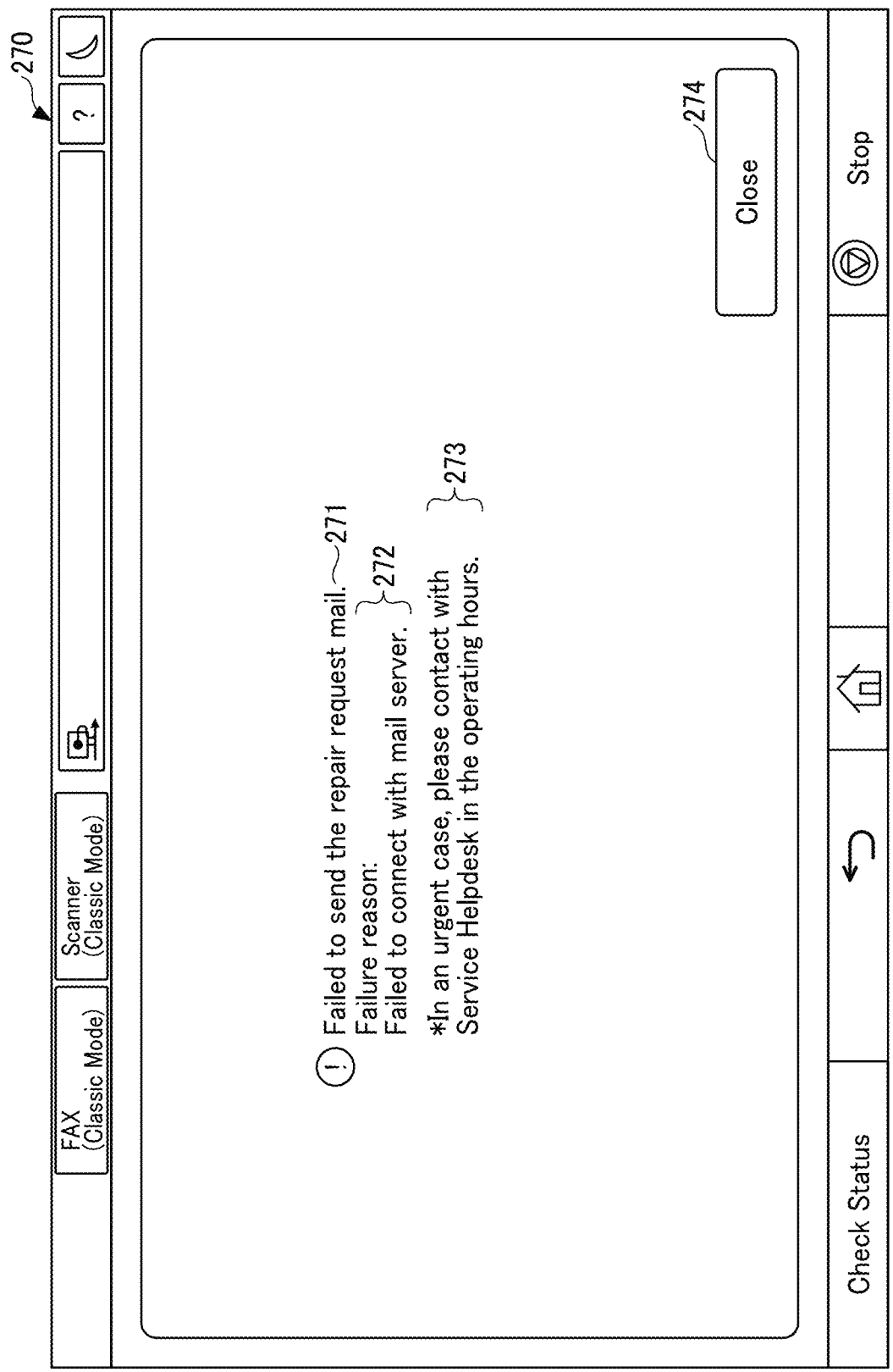
FIG. 42 is a diagram illustrating an example of a repair request mail transmission result screen (failed) according to the exemplary embodiment of the disclosure.

FIG. 42 is a diagram illustrating an example of the repair request mail transmission result screen (failed) 270. The repair request mail transmission result screen (failed) 270 is a screen displayed when the transmission of the repair request mail is failed. The repair request mail transmission result screen (failed) 270 includes a message 271 indicating, for example, "Failed to send the repair request mail.", a reason for failure 272, and information on an urgent case 273. In response to the close button 274 being pressed, the repair request mail transmission result screen (failed) 270 returns to the repair request screen 200.

Screen in Setting Information for Repair Request Application:

Screens in setting information for the repair request application 39 are described below, but a description of the screens described above is omitted below.

Figure 43:
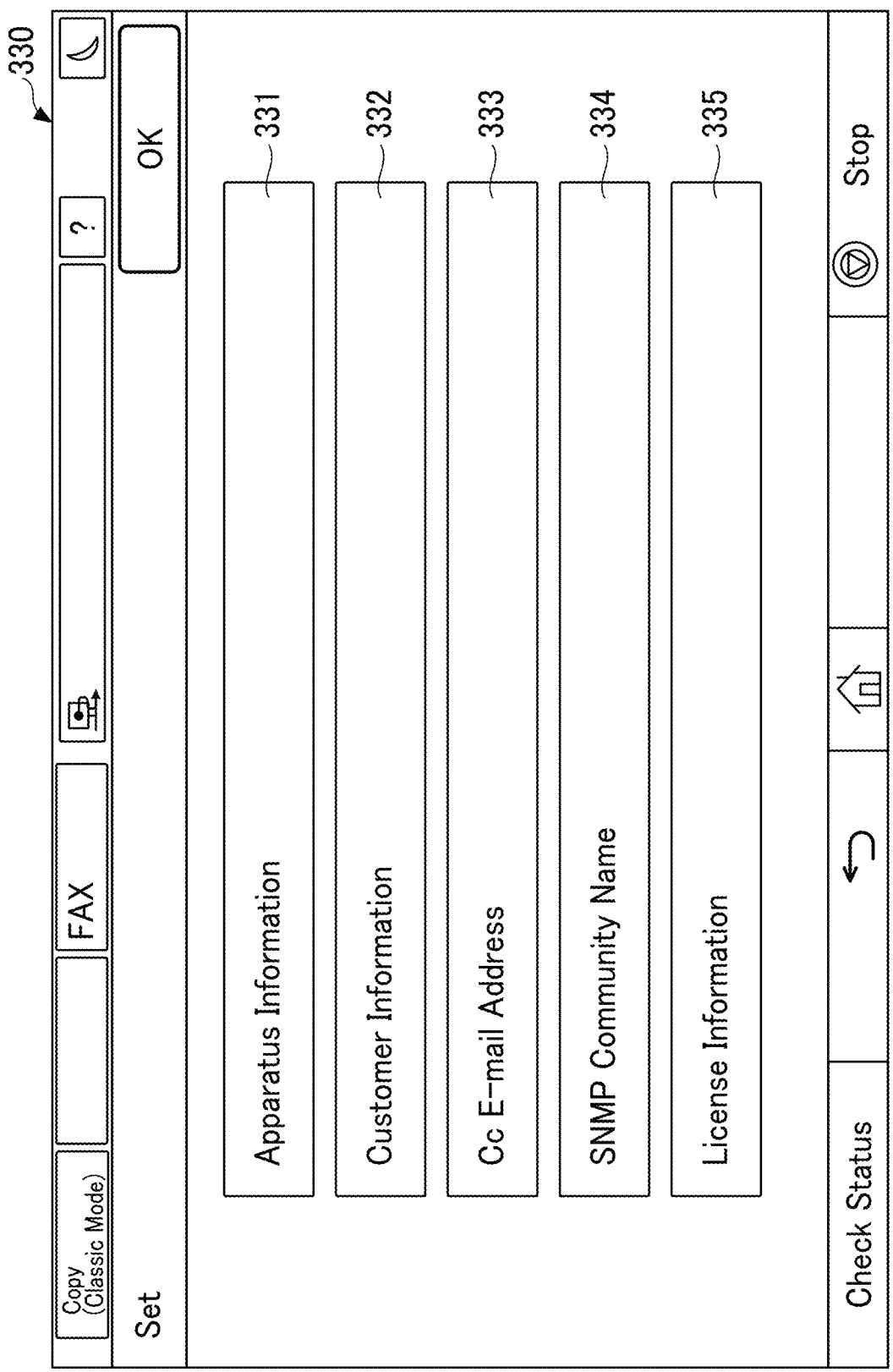
FIG. 43 is a diagram illustrating an example of a setting screen according to the exemplary embodiment of the disclosure.

FIG. 43 is a diagram illustrating an example of a setting screen 330. The setting screen 330 is a screen serving as a starting point of various settings. The setting screen 330 includes an apparatus information button 331, a customer information button 332, an e-mail CC setting button 333, an MIB community name button 334, and a license information button 335. In response to the apparatus information button 331, the customer information button 332, or the e-mail CC setting button 333 being pressed, the setting screen 330 transitions to the apparatus information setting screen 130, the customer information setting screen 140, or the e-mail CC setting screen 150 described above.

Figure 44:
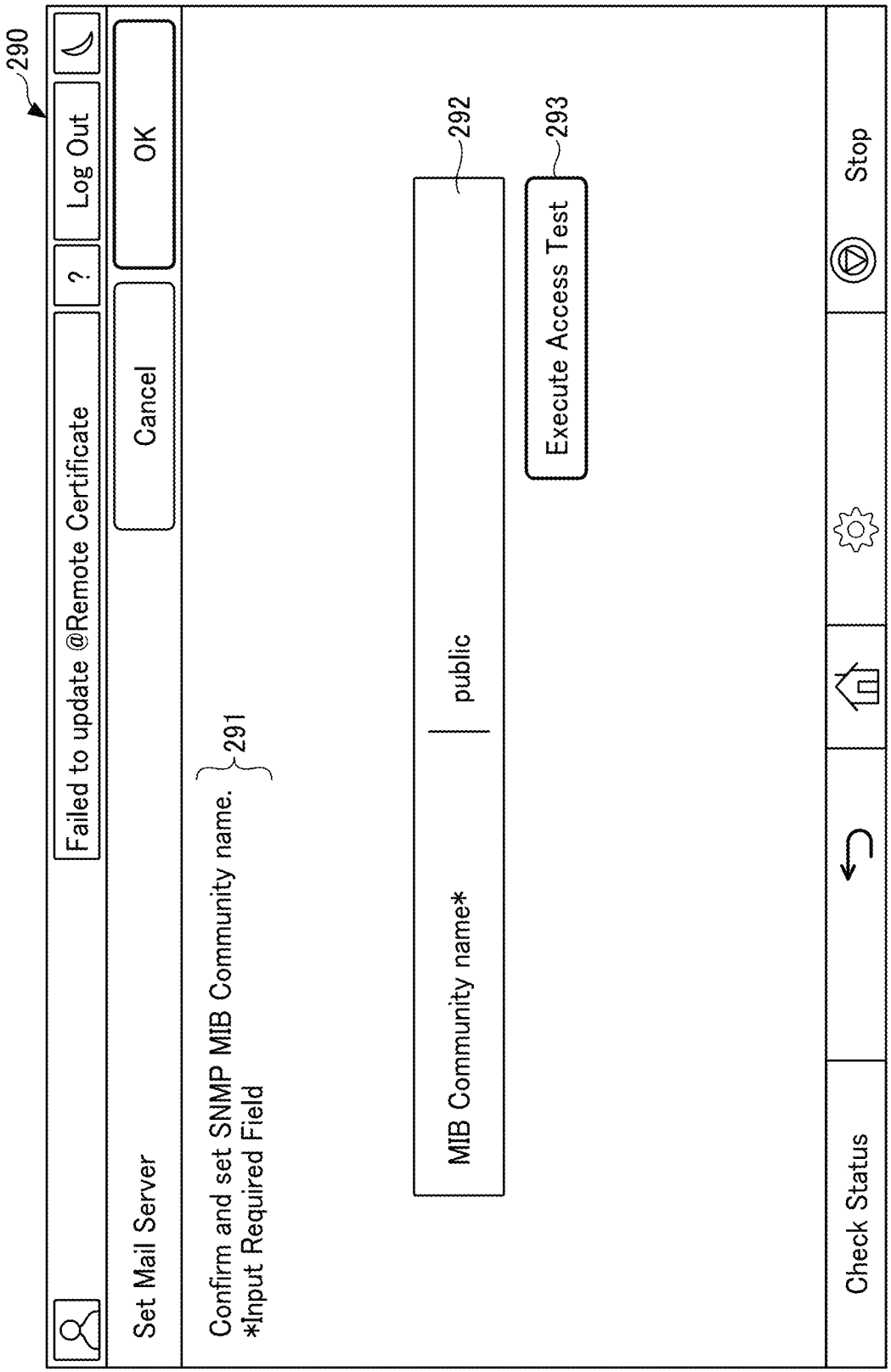
FIG. 44 is a diagram illustrating an example of an MIB community name setting screen according to the exemplary embodiment of the disclosure.

FIG. 44 is a diagram illustrating an example of the MIB community name setting screen 290. The MIB community name setting screen 290 is a screen that is for setting an MIB and that is displayed in response to the MIB community name button 334 being pressed. The MIB community name setting screen 290 includes a message 291 indicating, for example, "Confirm and set a MIB Community name in a simple network management protocol (SNMP), and if necessary, change it," a community name setting field 292, and an access test button 293.

In response to the access test button 293 being pressed, the repair request application executes a test to check whether the set MIB community name is available to access an MIB value. The MIB community name is a password used to access the MIB value in the SNMP. During the access test, a progress bar is displayed at the center of the screen. When the access is successful, the access test result screen (succeeded) 310 is displayed, and when the access is failed, the access test result screen (failed) 320 is displayed.

Figure 45:
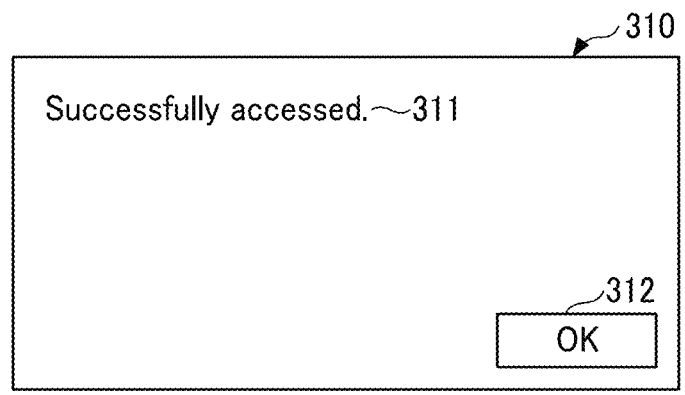
FIG. 45 is a diagram illustrating an example of an access test result screen (succeeded) according to the exemplary embodiment of the disclosure.

FIG. 45 is a diagram illustrating an example of the access test result screen (succeeded) 310. The access test result screen (succeeded) 310 is a screen displayed when the access test to the MIB is successful. The access test result screen (succeeded) 310 includes a message 311 indicating, for example, "Successfully accessed." and an OK button 312. In response to the OK button 312 being pressed, the access test result screen (succeeded) 310 returns to the MIB community name setting screen 290.

Figure 46:
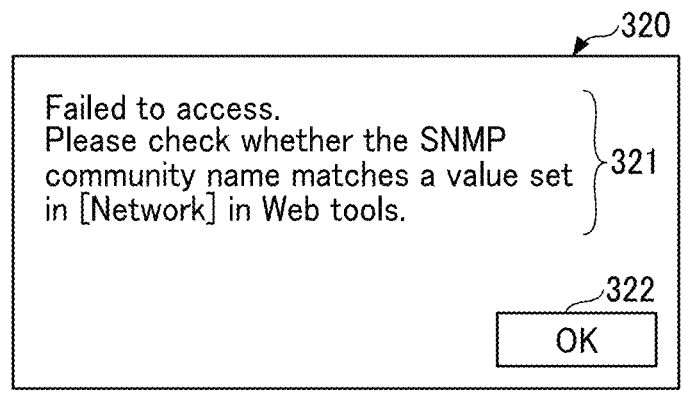
FIG. 46 is a diagram illustrating an example of an access test result screen (failed) according to the exemplary embodiment of the disclosure.

FIG. 46 is a diagram illustrating an example of the access test result screen (failed) 320. The access test result screen (failed) 320 is a screen displayed when the access test to the MIB is failed. The access test result screen (failed) 320 includes a message 321 indicating, for example, "Failed to access. Please check whether the SNMP community name matches a value set in [Network] in Web tools." and an OK button 322. In response to an OK button 322 being pressed, the screen returns to the MIB community name setting screen 290.

Figure 47:
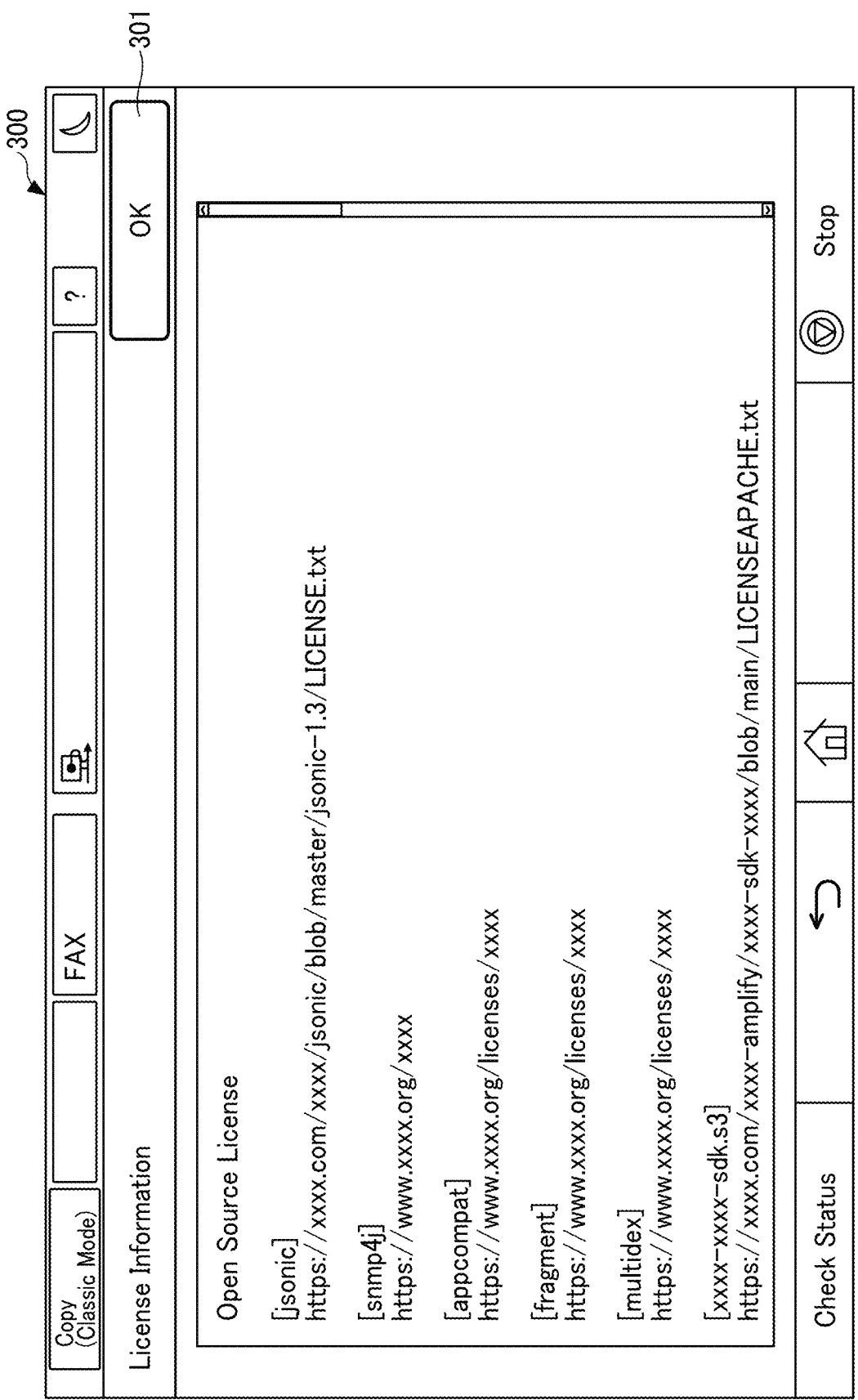
FIG. 47 is a diagram illustrating an example of a license information screen according to the exemplary embodiment of the disclosure.

FIG. 47 is a diagram illustrating an example of the license information screen 300. The license information screen 300 is a screen that is for displaying license information and that is displayed in response to the license information button 335 being pressed.

In response to the OK button 301 being pressed, the license information screen 300 returns to the setting screen 330.

Figure 48:
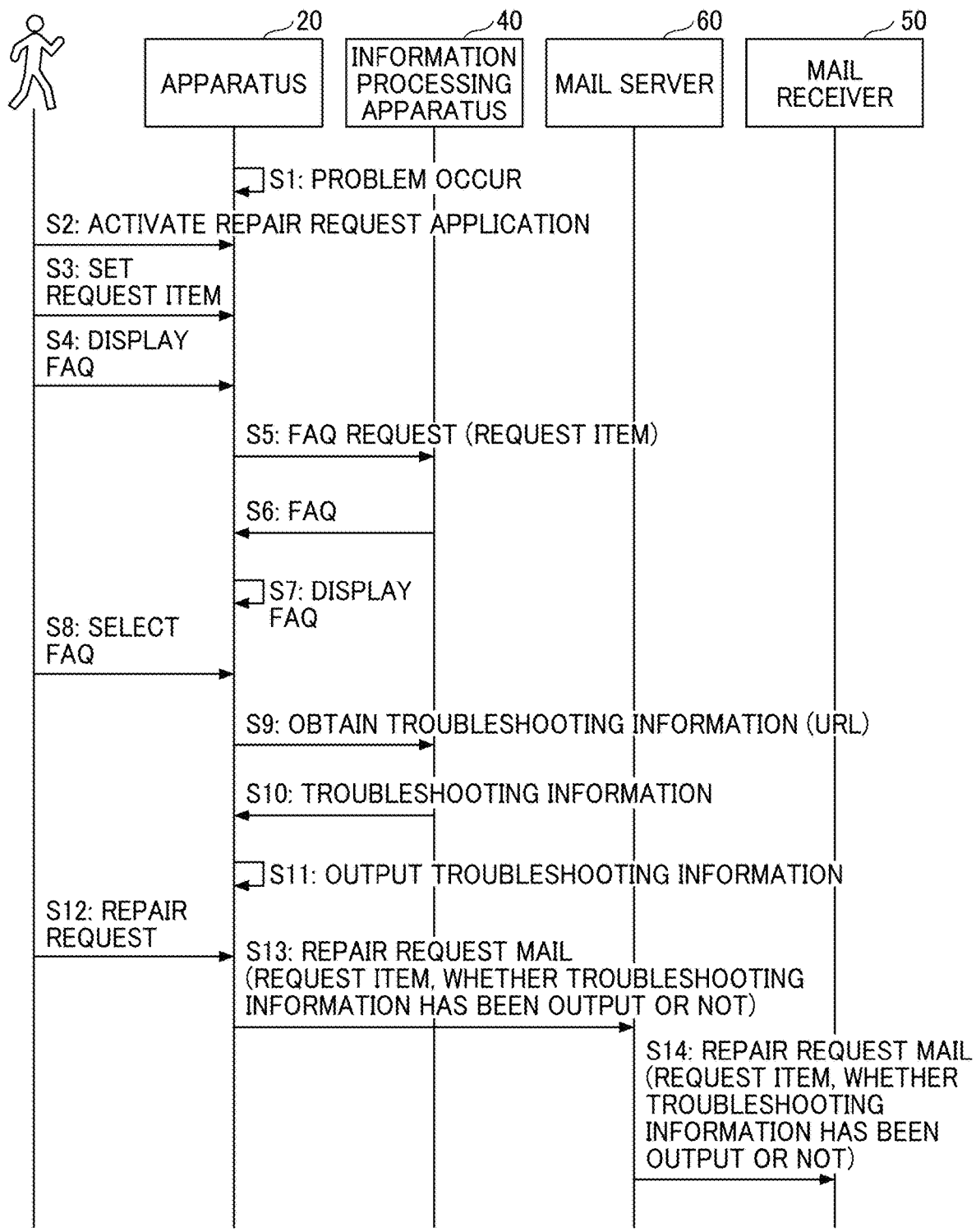
FIG. 48 is a sequence diagram illustrating an example of a process in which the apparatus transmits the repair request mail according to the exemplary embodiment of the disclosure.
Figure 49A:
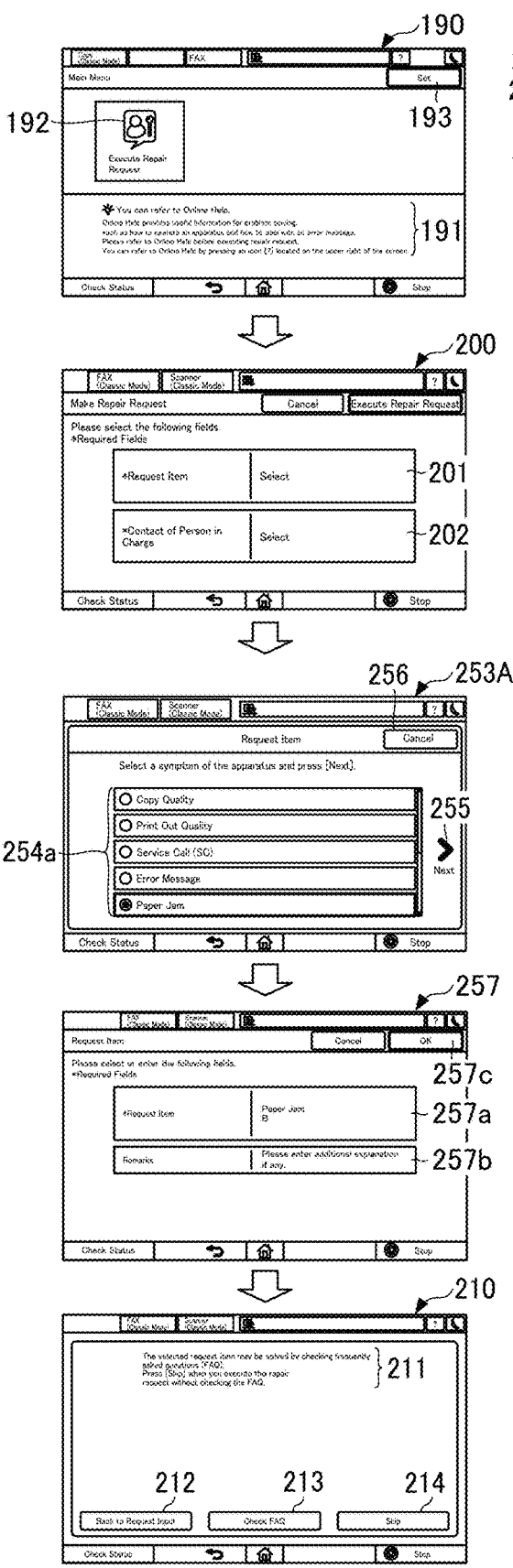
FIG. 49A and FIG. 49B are diagrams illustrating an example of a screen transition in which the screens transition one to another in executing a repair request according to the exemplary embodiment of the disclosure.
Figure 49B:
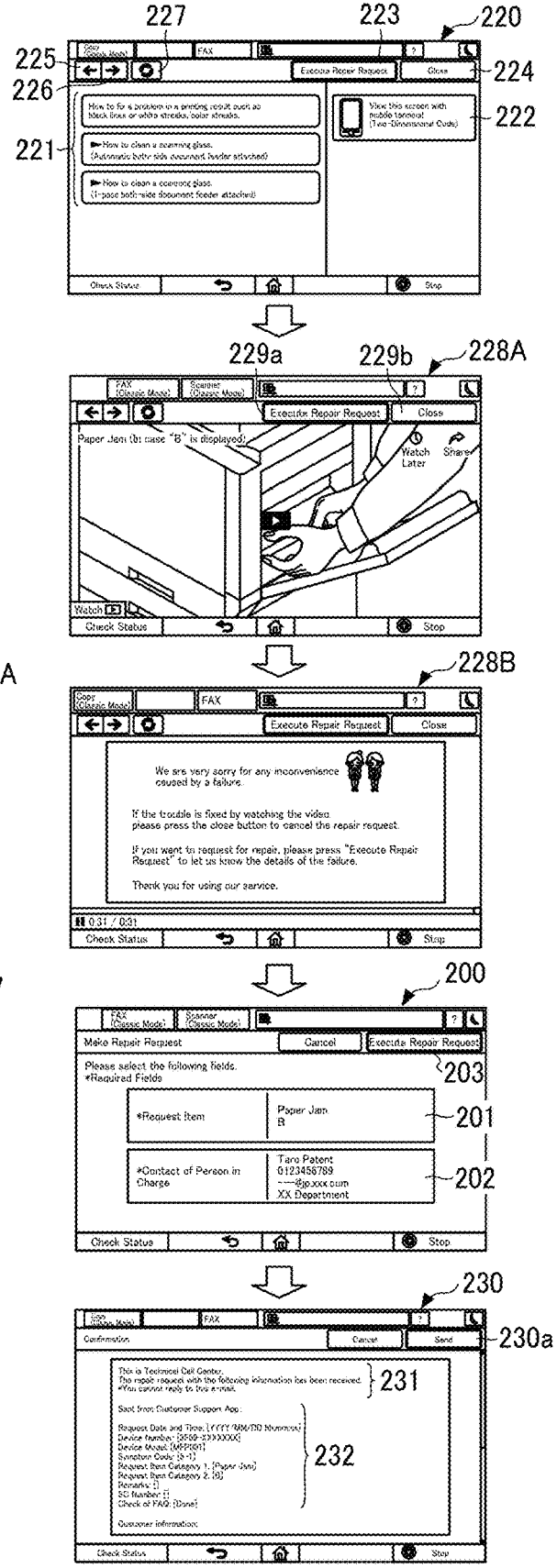

Process:

Referring to FIG. 48, operation performed by the apparatus 20 when the user executes the repair request is described below. FIG. 48 is a sequence diagram illustrating an example of a process in which the apparatus 20 transmits a repair request mail. In FIG. 48, processing of establishing a communication between the apparatus 20 and the information processing apparatus 40 for screen display is omitted. FIG. 49A and FIG. 49B are diagrams illustrating an example of a screen transition in which the screens transitions one to another in executing the repair request. Each screen in FIG. 49A and FIG. 49B is already described above.

S1: A problem, or a failure, occurs in relation to the apparatus 20.

S2: The user presses the activation icon 450 to activate the repair request application 39 in order to solve the problem. The operation reception unit 23 of the apparatus 20 receives a command for activating the repair request application 39, and the repair request application 39 is activated.

S3: According to a user operation, the repair request screen 200 of FIG. 29A is caused to be displayed from the main menu screen 190. According to a user operation, the repair request screen 200 transitions to the request item selection screen (part 1) 253A of FIG. 31A for setting a category and to the request item selection screen (part 2) 253B of FIG. 31B for setting a subcategory. The category and the subcategory are included in the request item. The user confirms the request item on the post-request-item-selection screen 257 of FIG. 32, and presses the OK button 257*c* to display the self-solving method display permission screen 210 of FIG. 33.

S4: The user presses the FAQ check button 213 on the self-solving method display permission screen 210 in order to solve the problem by himself or herself. The operation reception unit 23 of the apparatus 20 receives the user operation of pressing.

S5: The first communication unit 21 of the apparatus 20 specifies the request item and requests for an FAQ to the information processing apparatus 40.

S6: The second communication unit 41 of the information processing apparatus 40 receives the request for the FAQ, and the troubleshooting information determination unit 42 determines the FAQ corresponding to the request item from the troubleshooting information storage unit 43. The troubleshooting information determination unit 42 may input the request item to a classification device obtained by machine learning and determine the FAQ based on the request item. The troubleshooting information determination unit 42 embeds an URL of a storage destination of the troubleshooting information in the FAQ. The second communication unit 41 of the information processing apparatus 40 transmits the FAQ to the apparatus 20.

S7: The first communication unit 21 of the apparatus 20 receives the FAQ, and the display control unit 22 displays the FAQ (the FAQ display screen 220 of FIG. 34). The information processing apparatus 40 may transmit the troubleshooting information without transmitting the FAQ. For example, in a case that the number of FAQs corresponding to the request item is one so that the troubleshooting information is specified as the corresponding one, the information processing apparatus 40 transmits the troubleshooting information. This reduces time and effort taken by the user to select the FAQ.

S8: The user selects from the FAQ list 221 displayed on the FAQ display screen 220 a FAQ useful for solving the problem that has occurred. The operation reception unit 23 receives the selection.

S9: The first communication unit 21 of the apparatus 20 requests to obtain the troubleshooting information to the URL embedded in the FAQ. In FIG. 48, the URL points to the information processing apparatus 40, but may point to a content server.

S10: The first communication unit 21 of the apparatus 20 receives the troubleshooting information (for example, moving image, still image, text, or audio).

S11: The troubleshooting information output unit 24 outputs the troubleshooting information (troubleshooting screens 228A and 228B of FIG. 35A and FIG. 35B). The troubleshooting information output unit 24 holds the fact that the troubleshooting information has been output in association with the category, the subcategory, and the symptom code.

S12: The user checks the troubleshooting information and tries to solve the problem. In the following description, a case where the user failed to solve the problem is given. The user presses the repair request execution button 229*a* on the troubleshooting screens 228A of FIG. 35A or 228B of FIG. 35B. The operation reception unit 23 receives the user operation of pressing. Accordingly, the display control unit 22 displays the repair request screen 200 of FIG. 29B.

The user presses the request execution button 203 on the repair request screen 200. The operation reception unit 23 receives the user operation of pressing. Accordingly, the display control unit 22 displays the repair request mail confirmation screen 230 of FIG. 39. Then, the user presses the send button 230*a*. The operation reception unit 23 receives the user operation of pressing.

S13: The repair request unit 25 of the apparatus 20 generates an e-mail of which main text includes the request item and the information indicating whether the troubleshooting information has been output or not, and transmits the repair request mail to the mail server 60. The repair request unit 25 stores a date and time when the repair request mail is transmitted. The request item and the information indicating whether the troubleshooting information has been output or not may be transmitted in a format other than the e-mail. For example, the repair request unit 25 may create a file, attach the file to an e-mail, and transmit the e-mail to the mail server 60. In addition, the repair request unit 25 may transmit the request item and the information indicating whether the troubleshooting information has been output or not to the information processing apparatus 40 or a predetermined storage server. The information processing apparatus 40 or a predetermined storage server may store the information, and a customer engineer of the customer support center 10 may download the information to a terminal.

S14: The third communication unit 51 of the mail receiver 50 receives the repair request mail from the mail server 60.

As described above, since the apparatus 20 attaches the information indicating whether the troubleshooting information has been output or not to the repair request, the person in charge of repair can recognize that the failure is not related to at least the content of the troubleshooting information, so that the person in charge of repair can determine a repairing way to deal with the problem.

Details of Repair Request Mail:

FIG. 50 is a diagram illustrating an example of information included in the repair request mail according to the present embodiment.

The information included in the repair request mail includes a transmission source address 401, namely an address of sender, a destination address 402, a title 403, and main text 404.

The transmission source address 401 is an e-mail address unique to the troubleshooting application.

The destination address 402 includes a call center reception e-mail address of "region" set in the repair request application 39, and a CC mail address set by the customer.

The subject 403 is [Service Request], [serial number], [SC ###], [Issue Category], and [Issue Subcategory]. [Service Request] is a fixed term, and [serial number] is a serial number of the apparatus 20. [SC ###] is a system error code. [Issue Category] is the category of the failure, and [Issue Subcategory] is the subcategory of the failure.

The main text 404 includes a message 405 indicating, for example, "This is Technical Call Center. The repair request with the following information has been received," content of troubleshooting application transmission 406, customer information 407, and device additional information 408.

The content of troubleshooting application transmission 406 further includes a creation date and time, a device number, a model name, a symptom code, a symptom classification 1, a symptom classification 2, remarks, a system error code, and information whether information for solving a matter is viewed or not.

- As to the creation date and time, a current date and time is automatically reflected.
- The device number and the model name are set on the apparatus information setting screen 130.
- The symptom code is identification information of the request item obtained by linking a category ID and a subcategory ID.
- The symptom classifications 1 and 2 are the request item (the category and the subcategory) selected in the request item selection screen (part 1) 253A of FIG. 31A and the request item selection screen (part 2) 253B of FIG. 31B.
- The remarks include information set in the remark field 252 of the request item setting screen 250 of FIG. 30.
- The SC number is a system error code. The SC number may not be set.
- As for the information on whether the troubleshooting information is output or not, whether the user has checked (output) the troubleshooting information or not is set. The information on whether the troubleshooting information is output or not may also include whether the user has actually viewed the troubleshooting information or not in addition to output. In a case of a moving image, the troubleshooting screen periodically requests a user operation, and remains with a stopped state when there is no operation. In a case of a still image, the user can view the entire troubleshooting information by turning pages. When the moving image or the still image is reproduced until the end, the fact that the troubleshooting information has been output (the fact that the user has actually viewed the image) is recorded.
- The customer information 407 includes a name of a person in charge, a telephone number, an e-mail address, a company name, a department name, and a region. These pieces of information are set with the customer information setting screen (part 1) 140A of FIG. 20A, the customer information setting screen (part 2) 140B of FIG. 20B, and the contact setting screen 260 of FIG. 37.
- The device additional information 408 is information that can be acquired from the apparatus 20. The device additional information 408 includes, for example, counter information, a printer status, a copy status, a scan status, and a fax status.

As described above, with the apparatus 20 according to the present embodiment, when a problem, or trouble, occurs in the apparatus 20, the troubleshooting information is provided for the user to attempt to fix the problem by himself or herself, and this allows the user to solve the problem by himself or herself as much as possible. This reduces frequency of traveling of a maintenance staff member to a problem occurring site. In addition, even when the problem, or the trouble, is not fixed with the troubleshooting information, the repair request including the attached request item and the information indicating whether the troubleshooting information has been output or not allows the maintenance staff member to recognize that the problem is not related to at least content of the troubleshooting information if the information indicates that the troubleshooting information has been output, and thereby solution that fixes the problem can be assessed.

Variation:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, in the present embodiment, the information on whether the apparatus 20 has output the troubleshooting information or not or the information on whether the user has viewed the troubleshooting information or not is transmitted to the customer support center 10 with the repair request mail. However, the repair request mail may include one or more of information on whether the apparatus 20 has requested an FAQ, information on whether the apparatus 20 has received the FAQ, information on whether the FAQ has been viewed, and information on whether the apparatus 20 has requested the troubleshooting information.

Further, the division of blocks in the functional block diagram illustrated in FIG. 5 is given by way of example. A plurality of blocks may be implemented as one block, or one block may be divided into a plurality of blocks. Alternatively, some functions may be moved to other blocks. Further, the functions of a plurality of blocks that have similar functions may be processed in parallel or in a time-division manner by a single unit of hardware or software.

The devices and apparatuses described in the examples are merely illustrative of one of a plurality of computing environments for implementing the present embodiment. In some embodiments, the information processing apparatus 40 includes multiple computing devices, such as a server cluster. The plurality of computing devices is configured to communicate with one another via any type of communication link, including a network or shared memory to implement the processing described in the present embodiment.

Further, the information processing apparatus 40 may be configured to share the processing steps disclosed in the above embodiments of the present disclosure such as the steps in FIG. 48 in various kinds of combinations. For example, any processes that are executed by a certain unit may be executed by a plurality of information processing apparatuses provided for the information processing apparatus 40. The information processing apparatus 40 may be integrated into one server device or may be divided into a plurality of devices or apparatuses.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

According to an embodiment of the disclosure, a method for troubleshooting performed by an apparatus (corresponding to, for example, the apparatus 20) is provided. The method includes receiving an input of problem information that is information on a problem, transmitting the problem information to an information processing apparatus (corresponding to, for example, the information processing apparatus 40) communicably connected to the apparatus via a network, and receiving, from the information processing apparatus, troubleshooting information corresponding to the problem information. The troubleshooting information is information to be used for solving the problem. The method includes outputting the troubleshooting information and transmitting, to an extraneous resource, a repair request. The repair request is attached with the problem information and information indicating whether the troubleshooting information has been output.

In a related art, an apparatus does not transmit information indicating whether troubleshooting information is output or not to outside. For example, when a user tries to solve a problem with reference to the troubleshooting information but fails to solve the problem, the user calls a call center to request for repair. However, the user explains details of the problem again to an operator of the call center, resulting in troublesome.

According to an embodiment, an apparatus that transmits information indicating whether troubleshooting information has been output or not to an extraneous resource is provided.

The invention claimed is:

1. An apparatus comprising circuitry configured to:
receive an input of problem information that is information on a problem;
transmit the problem information to an information processing apparatus communicably connected to the apparatus via a network;
receive, from the information processing apparatus, troubleshooting information corresponding to the problem information, the troubleshooting information being information for solving the problem;
output a first screen including a first transition button and a second transition button, wherein in a case that the first transition button is pressed, the first screen is transitioned to a second screen for displaying the troubleshooting information corresponding to the problem information including a moving image of operation instruction on solving the problem, and in a case that the second transition button is pressed, the first screen is transition to a third screen for making a repair request, the second screen also including a switching button for switching to the third screen;
output the troubleshooting information in the case that the second screen is displayed; and
transmit, to an extraneous resource, the repair request including the problem information and information indicating whether the troubleshooting information has been output in the case that the third screen is displayed.

2. The apparatus of claim 1, wherein
the circuitry
receives, from the information processing apparatus, a list of one or more inquiries each of which has probability of being useful for solving the problem indicated by the problem information, and
obtains the troubleshooting information through a uniform resource locator (URL) embedded in an inquiry selected from the list of the one or more inquiries according to a user operation.

3. The apparatus of claim 2, wherein
in a case that the circuitry receives, via a screen for receiving one of a first selection and a second selection, the second selection, before transmitting the problem information to the information processing apparatus, the first selection displaying the list of the one or more inquiries and the second selection skipping displaying the list of the one or more inquiries,
the circuitry
suspends a request for the troubleshooting information to the information processing apparatus, and
transmits, to the extraneous resource, the repair request including the problem information and information indicating that output of the troubleshooting information has been unexecuted.

4. The apparatus of claim 2, wherein
the circuitry displays, on a display, the list of the one or more inquiries and a two-dimensional code for displaying the list of the one or more inquiries, the two-dimensional code being to be captured by a portable terminal to display the list of the one or more inquiries on the portable terminal, the portable terminal being to display the troubleshooting information obtained through the URL embedded in an inquiry in response to receiving a selection of the inquiry from the list of the one or more inquiries.

5. The apparatus of claim 1, wherein
the circuitry
displays, on a display, a screen for receiving selection of one or more categories related to the problem,
receives the selection of the one or more categories as the problem information, and
receives the troubleshooting information corresponding to the one or more categories.

6. The apparatus of claim 1, wherein
the circuitry stores, in a memory, a date and time indicating when the repair request is transmitted to the extraneous resource, and
in a case that an operation for transmitting another repair request for the problem is received within a certain period of time from the date and time of the repair request, the circuitry displays, on a display, a screen for checking whether the another repair request overlaps with the repair request.

7. The apparatus of claim 1, wherein
the circuitry transmits, to a destination set in advance, an electronic mail including the problem information and the information indicating whether the troubleshooting information has been output.

8. An information processing system, comprising:
an apparatus including apparatus circuitry; and
an information processing apparatus communicably connected to the apparatus via a network and including information processing apparatus circuitry, the apparatus circuitry being configured to:
receive an input of problem information that is information on a problem;
transmit, to the information processing apparatus, the problem information;
receive, from the information processing apparatus, troubleshooting information corresponding to the problem information, the troubleshooting information being information for solving the problem;
output a first screen including a first transition button and a second transition button, wherein in a case that the first transition button is pressed, the first screen is transitioned to a second screen for displaying the troubleshooting information corresponding to the problem information including a moving image of operation instruction on solving the problem, and in a case that the second transition button is pressed, the first screen is transition to a third screen for making a repair request, the second screen also including a switching button for switching to the third screen;
output the troubleshooting information in the case that the second screen is displayed; and
transmit, to an extraneous resource, a repair request including the problem information and information indicating that the troubleshooting information has been output in the case that the third screen is displayed in,
the information processing apparatus circuitry being configured to transmit, to the apparatus, one of the troubleshooting information corresponding to the problem information and a storage destination of the troubleshooting information.

9. A non-transitory recording medium storing a plurality of instructions which, when executed by one or more processors, causes the processors to perform a method, the method comprising:
receiving an input of problem information that is information on a problem;
transmitting, to an information processing apparatus, the problem information;
receiving, from the information processing apparatus, troubleshooting information corresponding to the problem information, the troubleshooting information being information for solving the problem;
outputting a first screen including a first transition button and a second transition button, wherein in a case that the first transition button is pressed, the first screen is transitioned to a second screen for displaying the troubleshooting information corresponding to the problem information including a moving image of operation instruction on solving the problem, and in a case that the second transition button is pressed, the first screen is transition to a third screen for making a repair request, the second screen also including a switching button for switching to the third screen;
outputting the troubleshooting information in the case that the second screen is displayed; and
transmitting, to an extraneous resource, a repair request including the problem information and information indicating whether the troubleshooting information has been output in the case that the third screen is displayed.

* * * * *